US012595835B2

(12) United States Patent
Kropczynski

(10) Patent No.: US 12,595,835 B2
(45) Date of Patent: Apr. 7, 2026

(54) END-STOP CONTROL VALVES FOR PROVIDING PROGESSIVE DAMPING FORCES IN VIBRATION DAMPERS

(71) Applicants: Thyssenkrupp Bilstein of America Inc., Hamilton, OH (US); thyssenkrupp AG, Essen (DE)

(72) Inventor: Peter Kropczynski, Cincinnati, OH (US)

(73) Assignees: Thyssenkrupp Bilstein of America Inc., Hamilton, OH (US); thyssenkrupp AG, Essen (DE)

( * ) Notice: Subject to any disclaimer, the term of this patent is extended or adjusted under 35 U.S.C. 154(b) by 755 days.

(21) Appl. No.: 17/952,989

(22) Filed: Sep. 26, 2022

(65) Prior Publication Data

US 2024/0084872 A1 Mar. 14, 2024

Related U.S. Application Data

(60) Provisional application No. 63/405,337, filed on Sep. 9, 2022.

(51) Int. Cl.
*F16F 13/00* (2006.01)
*B60G 15/06* (2006.01)

(52) U.S. Cl.
CPC .......... *F16F 13/007* (2013.01); *B60G 15/061* (2013.01); *B60G 2202/30* (2013.01);
(Continued)

(58) Field of Classification Search
CPC ........................ F16F 9/3482; F16F 2230/007
See application file for complete search history.

(56) References Cited

U.S. PATENT DOCUMENTS

| 3,038,560 | A | 6/1962 | Long, Jr. |
| 3,111,201 | A | 11/1963 | Bliven et al. |
| (Continued) | | | |

FOREIGN PATENT DOCUMENTS

| CN | 108757811 A | 11/2018 |
| CN | 114763818 A | 7/2022 |
| (Continued) | | |

OTHER PUBLICATIONS

Javier Lizarraga Sener, Double Hydraulic Stop (DHS) Suspension, pp. 19-24 (2019).

*Primary Examiner* — Melody M Burch
(74) *Attorney, Agent, or Firm* — thyssenkrupp North America, LLC

(57) ABSTRACT

A vibration damper includes an end-stop control valve that progressively adds end-of-stroke damping force to complement the damping force provided by a main piston. The end-stop control valve may include a valve piston assembly that has a valve piston insert, a piston that is disposed radially outside the valve piston insert, and a valve disc stack-up that is supported on a hub of the valve piston insert and a valve seat of the piston. The valve piston insert and the piston may be arranged so as to be longitudinally movable relative to one another. Consequently, the preload of the valve disc stack-up increases as the valve piston assembly contacts a catch piston and begins end-of-stroke damping. Transitioning from an initial preload to a maximum preload during the end-of-stroke damping event progressively increases damping resistance and thereby improves NVH characteristics.

17 Claims, 21 Drawing Sheets

(52) U.S. Cl.
CPC ...... *B60G 2206/41* (2013.01); *B60G 2500/11* (2013.01); *B60G 2800/162* (2013.01); *F16F 2222/12* (2013.01); *F16F 2228/066* (2013.01); *F16F 2230/007* (2013.01); *F16F 2230/42* (2013.01); *F16F 2232/08* (2013.01); *F16F 2234/02* (2013.01)

(56) References Cited

U.S. PATENT DOCUMENTS

| | | | |
|---|---|---|---|
| 4,768,629 A | 9/1988 | Wossner | |
| 5,219,414 A | 6/1993 | Yamaoka | |
| 6,626,274 B2 | 9/2003 | Pfundstein et al. | |
| 6,681,906 B1 | 1/2004 | Sasse | |
| 7,975,994 B2 | 7/2011 | Born et al. | |
| 8,162,112 B2 | 4/2012 | Gartner et al. | |
| 8,418,820 B2 | 4/2013 | Kim | |
| 9,695,899 B2 | 7/2017 | Smith et al. | |
| 10,107,352 B2 | 10/2018 | Grzesik et al. | |
| 10,208,830 B2 | 2/2019 | Bruno et al. | |
| 10,371,226 B2 | 8/2019 | Bruno et al. | |
| 10,683,906 B2 | 6/2020 | Kus et al. | |
| 11,320,017 B2 | 5/2022 | Bielak | |
| 2002/0027051 A1* | 3/2002 | Grundei | F16F 9/5126 188/322.22 |
| 2006/0290037 A1 | 12/2006 | Born et al. | |
| 2010/0059321 A1 | 3/2010 | Boivin | |
| 2015/0192187 A1 | 7/2015 | Smith et al. | |
| 2016/0025174 A1 | 1/2016 | Lizarraga Senar | |
| 2016/0223045 A1 | 8/2016 | Baldoni et al. | |
| 2018/0223942 A1 | 8/2018 | Kus et al. | |
| 2018/0355944 A1 | 12/2018 | Veltum et al. | |
| 2020/0011395 A1 | 1/2020 | Sankaran et al. | |
| 2020/0141466 A1 | 5/2020 | Miyata et al. | |
| 2021/0054901 A1 | 2/2021 | Gross et al. | |
| 2021/0088096 A1 | 3/2021 | Baldoni et al. | |
| 2021/0115998 A1 | 4/2021 | Meinert et al. | |
| 2021/0123495 A1 | 4/2021 | Sankaran et al. | |
| 2021/0180662 A1 | 6/2021 | Lizarraga Senar | |
| 2022/0333664 A1 | 10/2022 | Kasprzyk et al. | |
| 2024/0084872 A1 | 3/2024 | Kropczynski | |

FOREIGN PATENT DOCUMENTS

| | | | | |
|---|---|---|---|---|
| DE | 15 05 360 A1 | 3/1970 | | |
| DE | 35 33 387 A1 | 3/1987 | | |
| DE | 10041199 C1 * | 11/2001 | ........... | F16F 9/5126 |
| DE | 10 2004 015 448 B3 | 8/2005 | | |
| DE | 10 2005 002 007 A1 | 3/2006 | | |
| DE | 10 2010 020 052 A1 | 11/2011 | | |
| DE | 11 2016 000 630 T5 | 11/2017 | | |
| DE | 20 2019 101 886 U1 | 8/2020 | | |
| DE | 11 2020 005 512 T5 | 8/2022 | | |
| DE | 11 2016 000 579 T5 | 3/2024 | | |
| EP | 3 173 655 A1 | 5/2017 | | |
| EP | 3 207 273 A1 | 8/2017 | | |
| FR | 2800141 A1 * | 4/2001 | ............. | F16F 9/464 |
| FR | 2914716 B1 * | 5/2009 | | |
| JP | 2008-151253 A | 7/2008 | | |
| JP | 2021191967 A | 12/2021 | | |
| WO | 2015/105791 A1 | 7/2015 | | |

\* cited by examiner

Figure 7

END-STOP CONTROL VALVES FOR PROVIDING PROGESSIVE DAMPING FORCES IN VIBRATION DAMPERS

CROSS REFERENCE TO RELATED APPLICATION

This application is a non-provisional that claims priority to U.S. Provisional Patent Application No. 63/405,337, which is hereby incorporated by reference in its entirety.

FIELD

The present disclosure generally relates to vibration dampers, including end-stop control valves that are configured to provide a progressive amount of damping force in vibration dampers used in vehicles.

BACKGROUND

Vibration dampers or "shock absorbers" are used in automotive, recreational, and industrial vehicles to assist the vehicle in adapting to different driving conditions due to irregularities in the road such as bumps, potholes, and other road surface anomalies. Vibration dampers are also used to assist a vehicle in traveling over more extreme conditions such as off-road driving. In certain conditions, such as high-speed driving or off-road driving, for instance, the irregularities can be severe and may cause a standard vibration damper to bottom out, that is, abruptly reach its maximum compression or maximum rebound position and produce a jarring impact. When such a maximum compression or maximum rebound position occurs in the vibration damper, a sudden jolt can cause the respective wheel to lift off the ground. Hence, this jarring impact can also lead to a loss of traction.

To address such problems, vibration dampers with controlled compression stage end position damping were developed. Such a vibration damper is known from WIPO Patent Publication No. WO2015/105791 A1, where the vibration damper includes a first piston for controlling the rebound stage and the compression stage and a piston rod with a valve assembly. The first piston is arranged on the piston rod. If the valve assembly on the piston rod enters an end region of the damper tube in compression, the valve assembly engages a second piston to cause an increase in damping force. The second piston can be moved even farther in compression towards a third piston, which interacts with the second piston and causes a further increase in damping force. Vibration dampers like that disclosed in WIPO Patent Publication No. WO 2015/105791 A1 are oftentimes referred to as jounce control vibration dampers. More recent efforts, such as those disclosed in German Utility Model Application No. DE202019101886 U1, for example, have incorporated such "end-stop" or "auxiliary" pistons at both ends of the vibration damper to either prevent or at least ease into a state where the vibration damper is at a maximum compression position or a maximum rebound position.

However, the increase in damping force associated with such known auxiliary pistons resembles a step function into a peak force output, with a large increase in damping force being supplied as the auxiliary piston is engaged. Although this large increase in damping force is not nearly as harsh as the forces present at a maximum compression or maximum rebound position in a vibration damper without any form of jounce or rebound control, the jump in damping force can potentially cause a large, rapid change in acceleration;

undesirable noise, vibration, and harshness (NVH) effects within the vehicle; and a change in performance.

SUMMARY

A vibration damper may include a damper tube that contains hydraulic fluid. A main piston may be secured to a piston rod that is longitudinally movable within the damper tube. The main piston divides an interior of the damper tube into a first working chamber and a second working chamber. An end-stop control valve that can be used for jounce cutoff (JCO) may be positioned in the first working chamber. In some examples, the end-stop control valve can be positioned in the second working chamber for rebound cutoff (RCO). In still other examples, a vibration damper may include a JCO end-stop control valve and an RCO end-stop control valve.

The end-stop control valve may include an auxiliary piston that is arranged on the piston rod and is configured to move longitudinally within the damper tube. The auxiliary piston may include a valve seat. The end-stop control valve may further include a valve piston insert, which can be arranged radially within the auxiliary piston at one or more longitudinal locations along the piston rod within the damper tube. The valve piston insert may be secured to the piston rod, but the auxiliary piston may be movable relative to the valve piston insert in an assembled state of the vibration damper. A valve disc stack-up of the end-stop control valve can also be arranged on the piston rod. A radially inner portion of the valve disc stack-up may be supported on a valve hub of the valve piston insert, and a radially outer portion of the valve disc stack-up may be supported on the valve seat of the auxiliary piston.

Further, a catch piston of the end-stop control valve is disposed within the damper tube so as to form a seal between a radial exterior of the catch piston and an inner wall of the damper tube. The auxiliary piston is configured to engage the catch piston and form a seal between the auxiliary piston and the catch piston during an end-of-stroke damping event. This seal between the auxiliary piston and the catch piston forms a third working chamber between the catch piston and an end of the damper tube where hydraulic fluid is trapped. As a result, to leave the third working chamber hydraulic fluid must pass through passages that extend from a first longitudinal side of the auxiliary piston to a second longitudinal side of the auxiliary piston that is opposite the first longitudinal side. In some examples, a contour of each passage when viewed from a longitudinal perspective is elongated circumferentially. In other examples, the contour of each passage may be circular. Conversely, when the catch piston and the auxiliary piston are not engaged, hydraulic fluid can pass freely around the auxiliary piston, between the auxiliary piston and the inner wall of the damper tube.

The auxiliary piston and the valve piston insert are configured such that a longitudinal distance between the valve seat of the auxiliary piston and the valve hub of the valve piston insert increases during the end-of stroke damping event. Specifically, "preload" of the end-stop control valve, which is based on the longitudinal distance between the valve seat and the valve hub, increases from an "initial preload" to a "maximum preload" during the end-of-stroke damping event. Preload is indicative of the degree to which the valve disc stack-up is held against (or spaced apart from) the valve seat of the auxiliary piston. In cases where positive initial preload is utilized, the valve disc stack-up may be elastically deformed and thus held against the valve seat prior to an end-of-stroke damping event. The greater the initial preload, the more firmly the valve disc stack-up will be held against the valve seat. With zero initial preload, the valve disc stack-up rests against the valve seat without any elastic deformation. In cases where negative initial preload is utilized, the valve hub and thus the valve disc stack-up are spaced apart from the valve seat. When the initial preload is negative, space exists between the valve seat and the valve disc stack-up and hydraulic fluid can flow through the end-stop control valve without having to elastically deform the valve disc stack-up and force the valve disc stack-up longitudinally away from the valve seat, at least prior to an end-of-stroke damping event. Either way, damping force provided by the end-stop control valve increases as the longitudinal distance between the valve seat and the valve hub—and thus the preload—increases during the end-of-stroke damping event. The relative movement between the auxiliary piston and the valve piston insert enables the end-stop control valve to progressively increase the amount of damping force during an end-of-stroke damping event.

In a steady state where the auxiliary piston is disengaged from the catch piston, a seat of the auxiliary piston (i.e., different than the valve seat) is longitudinally spaced apart from a shoulder of the valve piston insert. The seat of the auxiliary piston and the shoulder of the valve piston insert are configured to contact one another during the end-of-stroke damping event. Maximum preload is present when the seat of the auxiliary piston contacts the shoulder of the valve piston insert. As explained above, the end-stop control valve is configured to provide more damping force at maximum preload than at initial preload. At maximum preload during the end-of-stroke damping event, the radially inner portion of the valve disc stack-up is longitudinally closer to a longitudinal midpoint of the auxiliary piston than at initial preload and thus the radially outer portion of the valve disc stack-up is held even more firmly against the valve seat of the auxiliary piston. Put another way, greater force is required to deflect the valve disc stack-up away from the valve seat at maximum preload than at initial preload.

In some cases, a wave spring may be positioned in an annular void that exists longitudinally and radially between the auxiliary piston and the valve piston insert. The wave spring may be compressed longitudinally during the end-of-stroke damping event. However, the wave spring is configured to force the auxiliary piston and the valve piston insert longitudinally apart after the end-of-stroke damping event when the auxiliary piston and the catch piston disengage. In addition or in the alternative, the valve disc stack-up may be configured to force the auxiliary piston and the valve piston insert longitudinally apart after the end-of-stroke damping event when the piston and the catch piston disengage. The valve disc stack-up forces the auxiliary piston and the valve piston insert longitudinally apart in cases of positive initial preload where the valve disc stack-up is elastically deformed and has a tendency to return to neutral state.

In some instances, one or more end-stop control valves and the main piston may be clamped on the piston rod between a shoulder of the piston rod and a fastener at a distal end of the piston rod. A clamping force generated by the fastener is responsible for the initial preload of the one or more end-stop control valves. A first retention disc may be disposed at the fastener, and a second retention disc may be disposed at the shoulder. The retention discs not only help distribute forces present at the fastener and at the shoulder, but can also help longitudinally align the auxiliary piston and the valve piston insert in a steady state, outside of end-of-stroke damping events.

In examples where a JCO end-stop control valve and an RCO end-stop control valve are utilized, during an end-of-stroke JCO damping event hydraulic fluid passes through both the JCO piston and the main piston but can pass freely between an exterior of the RCO piston and an inner wall of the damper tube. Similarly, during an end-of-stroke RCO damping event hydraulic fluid passes through both the RCO piston and the main piston but can pass freely between an exterior of the JCO piston and the inner wall of the damper tube.

BRIEF DESCRIPTION OF THE DRAWINGS

FIG. 7 is a detail cross-sectional view of the example assembly shown in FIGS. 4-6.

DETAILED DESCRIPTION

Although certain example methods and apparatuses are described herein, the scope of coverage of this patent is not limited thereto. On the contrary, this patent covers all methods, apparatuses, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claim need not necessarily be performed in the order in which they are recited, unless so required by the context of the claims. In addition, all references to one skilled in the art shall be understood to refer to one having ordinary skill in the art. With respect to the drawings, it should be understood that not all components are drawn to scale. Furthermore, those having ordinary skill in the art will understand that the various examples disclosed herein should not be considered in isolation. Rather, those with ordinary skill in the art will readily understand that the disclosure relating to some examples may be combined with and/or equally applicable to the disclosure relating to other examples.

Figure 1:
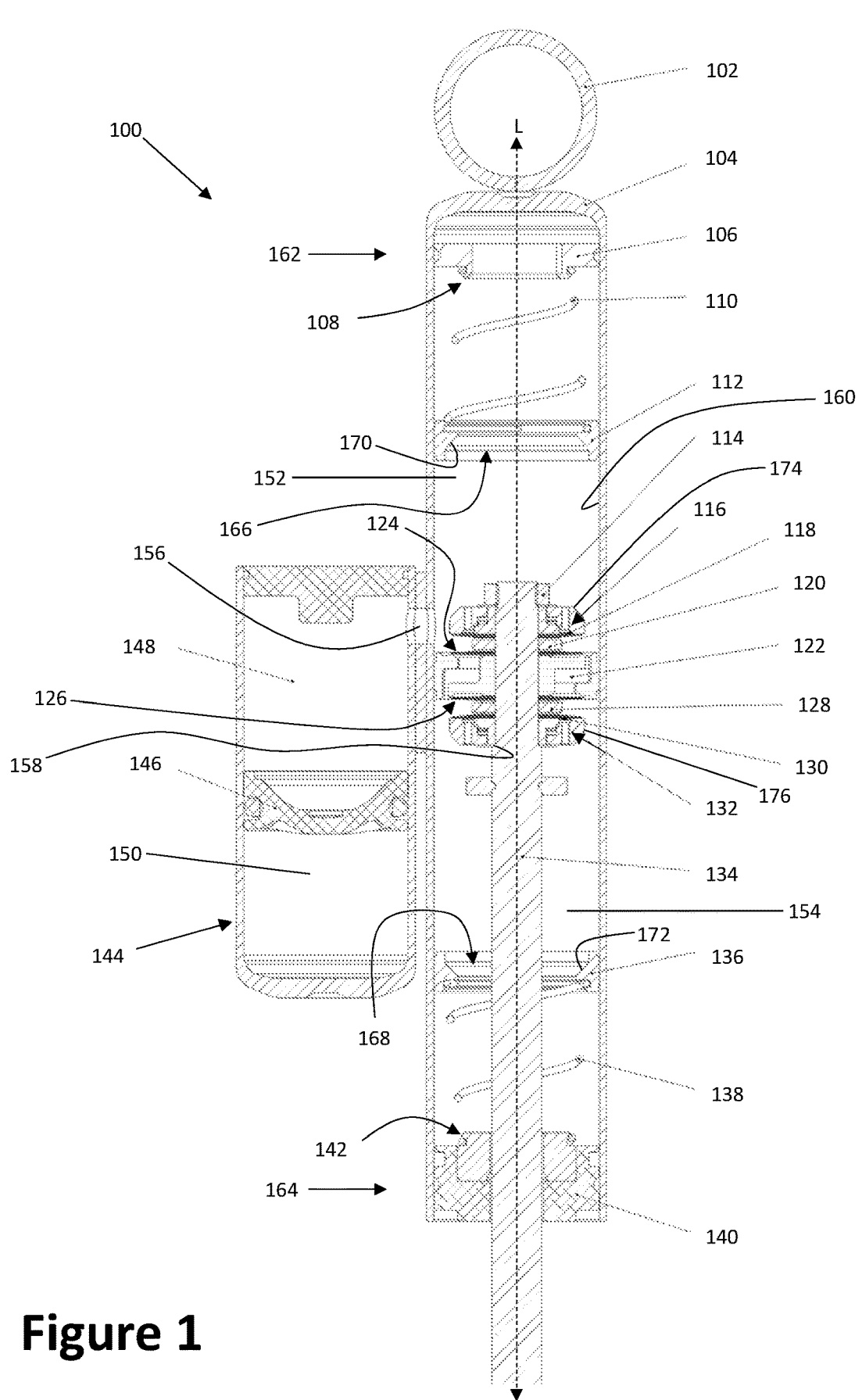
FIG. 1 is a cross-sectional view of an example vibration damper with end-stop control valves that are configured to provide a progressive amount of damping force.
Figure 2:
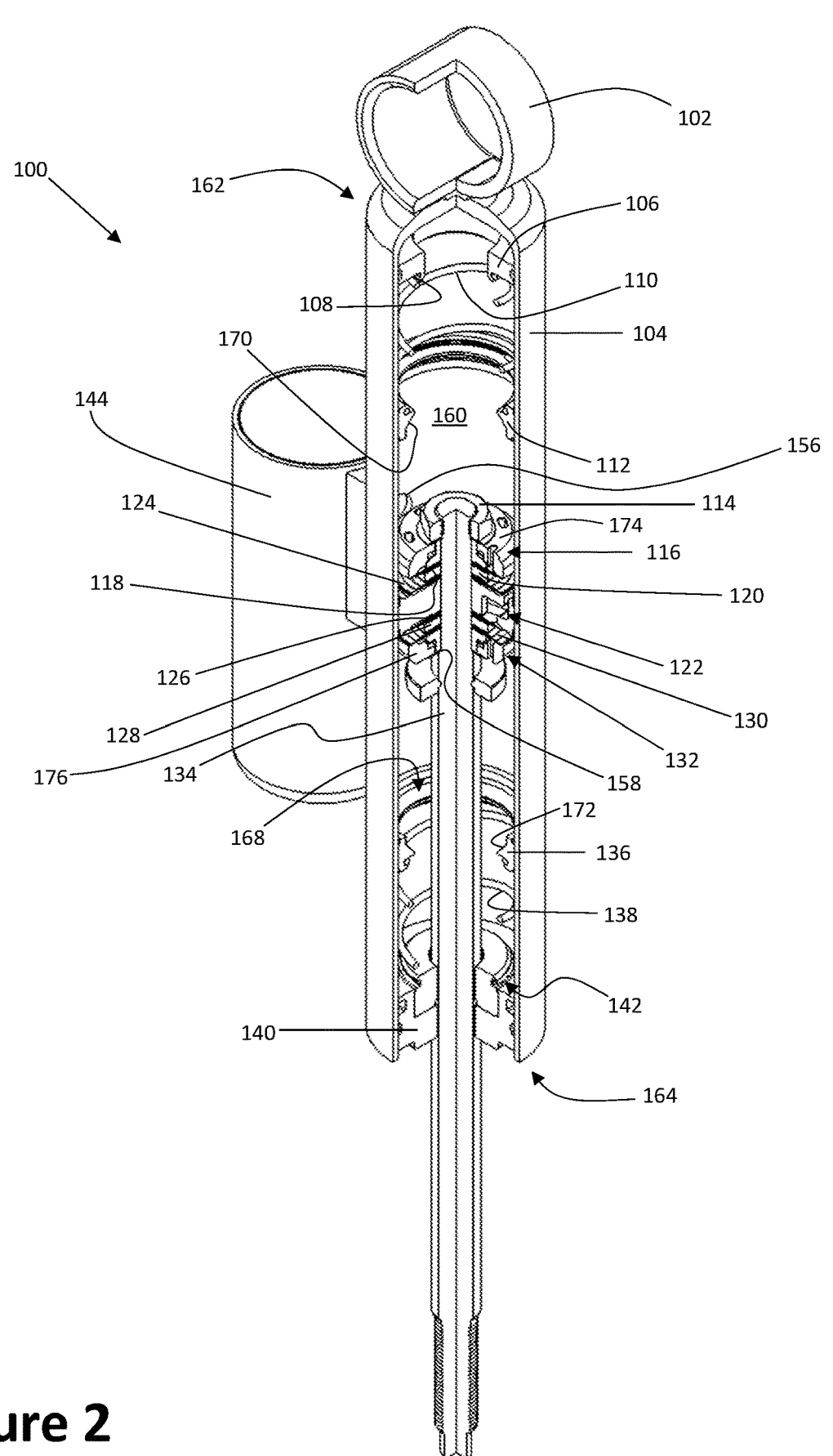
FIG. 2 is a 90° cutaway view of the example vibration damper shown in FIG. 1.

An example vibration damper 100 is shown in FIGS. 1 and 2, with FIG. 1 showing a cross-sectional view of the vibration damper 100 and FIG. 2 showing a cutaway view of the vibration damper 100. In general, the vibration damper 100 in this example includes an eye ring 102, a damper tube 104, a jounce cutoff (JCO) crimp ring 106 with spring retention means 108, a JCO spring 110, a JCO catch piston 112, a piston rod assembly fastener 114, a JCO valve piston assembly 116, a JCO valve disc stack-up 118 of the JCO valve piston assembly 116, a first brake washer 120, a main piston 122 with valve discs 124, 126, a second brake washer 128, a rebound cutoff (RCO) valve disc stack-up 130, an RCO valve piston assembly 132, a piston rod 134, an RCO catch piston 136, an RCO spring 138, a sealing package 140, spring retention means 142, and a reservoir 144 with a dividing piston 146 that separates the reservoir 144 into a first volume 148 and a second volume 150.

The main piston 122, the JCO valve piston assembly 116, and the RCO valve piston assembly 132, amongst other components, may be positioned along the piston rod 134 so as to be movable with the piston rod 134 in the damper tube 104 along a longitudinal axis L. The main piston 122 separates an interior of the damper tube 104 into a first working chamber 152 and a second working chamber 154, with the JCO valve piston assembly 116 being disposed in the first working chamber 152 and the RCO valve piston assembly 132 being disposed in the second working chamber 154. The working chambers 152, 154 are fluidly connected to one another by the main piston 122 depending on a direction of movement of the piston rod 134. For this purpose, the main piston 122 includes the valve discs 124, 126, which govern flow of hydraulic fluid during, respectively, a compression stage and a rebound stage of the vibration damper 100. During operation, the working chambers 152, 154 are filled with hydraulic fluid (not shown) or damper oil. To increase the damping force in the end regions of the damper tube 104, the JCO valve piston assembly 116 and the RCO valve piston assembly 132 engage, respectively, with the associated catch pistons 112, 136, which will be discussed in more detail further below.

The vibration damper 100 in this example also includes the reservoir 144 in which the dividing piston 146 for separating a damper gas from hydraulic fluid is movably arranged. In other words, the dividing piston 146 separates the first volume 148, which contains hydraulic fluid, from the second volume 150, which contains gas. The first volume 148 is fluidically connected to the first working chamber 152 of the damper tube 104 via a through-opening 156. During operation, the first volume 148 in the reservoir 144, much like the first and second working chambers 152, 154, is filled with hydraulic fluid. The second volume 150 is filled with gas, which charges, pressurizes, or otherwise biases the dividing piston 146 against the hydraulic fluid.

As can be seen in FIGS. 1 and 2, the main piston 122 is disposed between the JCO valve piston assembly 116 and the RCO valve piston assembly 132 on the piston rod 134. More specifically, the JCO valve piston assembly 116, the JCO valve disc stack-up 118 thereof, the first brake washer 120, the main piston 122, the second brake washer 128, the RCO valve piston assembly 132, and the RCO valve disc stack-up 130 thereof may be securely fastened along the piston rod 134 between the piston rod assembly fastener 114 and a shoulder 158, for example, of the piston rod 134. Hence, in the case of a compression stage or a rebound stage, the main piston 122, the JCO valve piston assembly 116, and the RCO valve piston assembly 132 move longitudinally with the piston rod 134. In many cases, the JCO valve piston assembly 116 and the RCO valve piston assembly 132 are mirror images of one another. In other cases, though, the JCO valve piston assembly 116 may be different (e.g., in terms of piston shape and/or valve disc stack-up) than the RCO valve piston assembly 132.

A radial gap is provided between the JCO valve piston assembly 116 and an inner wall 160 of the damper tube 104. Likewise, a radial gap is provided between the RCO valve piston assembly 132 and the inner wall 160 of the damper tube 104. Consequently, so long as neither the JCO catch piston 112 nor the RCO catch piston 136 is engaged, hydraulic fluid can flow around the JCO valve piston assembly 116 and around the RCO valve piston assembly 132 during operation of the vibration damper 100.

In some examples, vibration dampers may further include a spacer element that is disposed between a JCO valve piston assembly and a main piston. The spacer element may be pushed onto the piston rod and may, depending on the configuration, prevent the main piston from passing over a through-opening that leads to a reservoir. The spacer element may have a smaller radial extent than the valve piston assemblies. In other words, the spacer element may be configured to be smaller transversely to the longitudinal direction of the vibration damper than the valve piston assemblies. Further, the spacer element can be cylindrical. It should also be understood that the spacer element can have an angular cross section. In other words, the spacer element can also be cuboid.

With continued reference to the example vibration damper 100 shown in FIGS. 1 and 2, the JCO valve piston assembly 116 faces a first end 162 of the damper tube 104. The first end 162 of the damper tube 104 corresponds to an end of the damper tube 104 that faces away from the piston rod 134. The RCO valve piston assembly 132 faces a second end 164 of the damper tube 104. The second end 164 of the damper tube 104 corresponds to an end of the damper tube 104 on the piston rod side. The sealing package 140 is arranged in the damper tube 104 at the second end 164 of the damper tube 104. In some cases, the sealing package 140 may be positively connected to the damper tube 104. The sealing package 140 may be connected to the damper tube 104 by crimping. The piston rod 134 is guided in the sealing package 140 so that the piston rod 134 can move longitudinally.

In the first working chamber 152 of the damper tube 104, the JCO catch piston 112 is disposed towards the first end 162. The JCO catch piston 112 is movable longitudinally within the damper tube 104, although the JCO spring 110 restores the JCO catch piston 112 to the position shown in FIG. 1 when the JCO catch piston 112 is not engaged. Similarly, in the second working chamber 154 of the damper tube 104, the RCO catch piston 136 is disposed towards the second end 164. The RCO catch piston 136 is movable longitudinally within the damper tube 104, although the RCO spring 138 restores the RCO catch piston 136 to the position shown in FIG. 1 when the RCO catch piston 136 is not engaged. Further, the catch pistons 112, 136 may be annular and may be arranged in a sealing manner with respect to the inner wall 114 of the damper tube 104.

The catch pistons 112, 136 each have a main opening 166, 168 that extends longitudinally and is configured as a longitudinally-extending through opening. Each main opening 166, 168 has a sealing area 170, 172 that is configured to mate with a respective portion of the valve piston assemblies 116, 132. In particular, in the case of end-of-travel damping in compression a JCO piston 174 of the JCO valve piston assembly 116 engages and mates with the sealing area 170 of the JCO catch piston 112 to form a seal. In the case of end-of-travel damping in rebound, a RCO piston 176 of the RCO valve piston assembly 132 engages and mates with the sealing area 172 of the RCO catch piston 136 to form a seal. As can be seen especially in FIG. 1, the JCO piston 174 and the RCO piston 176 each have an outer contour that complements the sealing areas 170, 172 of the main openings 166, 168.

Also arranged at the first end 162 of the damper tube 104 is the JCO crimp ring 106, which may be positively connected to the damper tube 104 by crimping. The JCO crimp ring 106 and/or the sealing package 140 can also be pressed into the damper tube 104. In other words, the JCO crimp ring 106 and/or the sealing package 140 can be connected to the damper tube 104 in a non-positive manner. The JCO crimp ring 106 and/or the sealing package 140 can additionally or alternatively be integrally connected to the damper tube 106 by welding. In general, it is also conceivable for the JCO crimp ring 106 and/or the sealing package 140 to be connected to the damper tube 104 by still other techniques, including combinations of the connection types mentioned above.

The JCO crimp ring 106 and the sealing package 140 have spring retention means 108, 142 on which the JCO spring 110 and the RCO spring 138 are, respectively, fixedly arranged. The JCO crimp ring 106 and the sealing package 140 are arranged with the spring retention means 108, 142 in the longitudinal direction opposite the respective catch piston 112, 136. The spring retention means 108, 142 serve as an abutment on which the springs 110, 138 are supported. The springs 110, 138 hold the catch pistons 112, 136 in respective longitudinal starting positions when the catch pistons 112, 136 are not engaged. In particular, after endof-stroke cushioning, the JCO spring 110 guides the JCO catch piston 112 in a compression stage after longitudinal displacement or movement by the JCO valve piston assembly 116 back into the original, longitudinal starting position. Likewise, after end-of-stroke cushioning, the RCO spring 138 guides the RCO catch piston 136 in a rebound stage after longitudinal displacement or movement by the RCO valve piston assembly 132 back into the original, longitudinal starting position. As explained above, the springs 110, 138 serve as return springs. Furthermore, the JCO crimp ring 106 may also include an opening 178 for receiving at least part of the piston rod assembly fastener 114 and the piston rod 134 in a full compression stroke.

The general operation of the vibration damper 100 and the flow of hydraulic fluid therein will now be explained with reference to FIGS. 3A-3D, particularly with respect to the relation between the main piston 122 and the valve piston assemblies 116, 132. However, specific details regarding JCO and RCO valve piston assemblies will be explained further below with reference to more-detailed figures. And although FIGS. 3A-3D concern a compression stroke and thus primarily JCO-related components, those having ordinary skill in the art will understand the applicability of this teaching to a rebound stroke and RCO-related components as well. Finally, it should be understood that FIGS. 3A-3D show a simplified version of the vibration damper 100, as some parts have been omitted to facilitate the explanation.

Figure 3A:
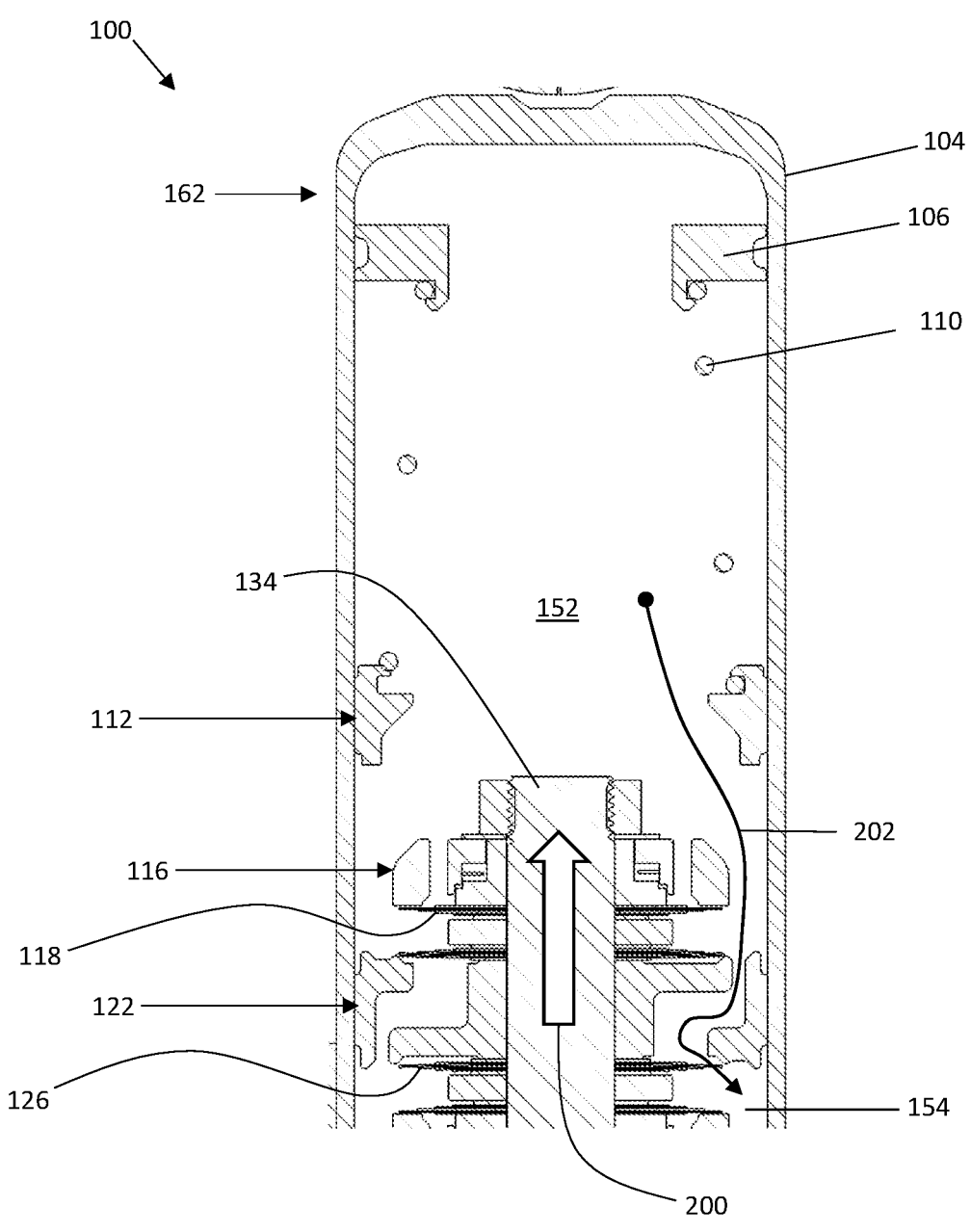
FIG. 3A is a cross-sectional view showing a first step in a sequence whereby an example end-stop control valve is engaged and then disengaged.

To reiterate, end-of-stroke damping is utilized in compression and in rebound where large displacement of the piston rod 134 occurs. To this end, FIG. 3A shows the piston rod 134 moving in a compression stroke towards the first end 162 of the damper tube 104, as represented by an upward-pointing arrow 200. Due to the stroke movement of the main piston 122 and due to the JCO valve piston assembly being spaced apart from the JCP catch piston 112, the hydraulic fluid flows from the first working chamber 152, around the JCO valve piston assembly 116, through the main piston 122, deflecting the valve discs 126 thereof, and into the second working chamber 154, as represented by a flow path 202.

Figure 3B:
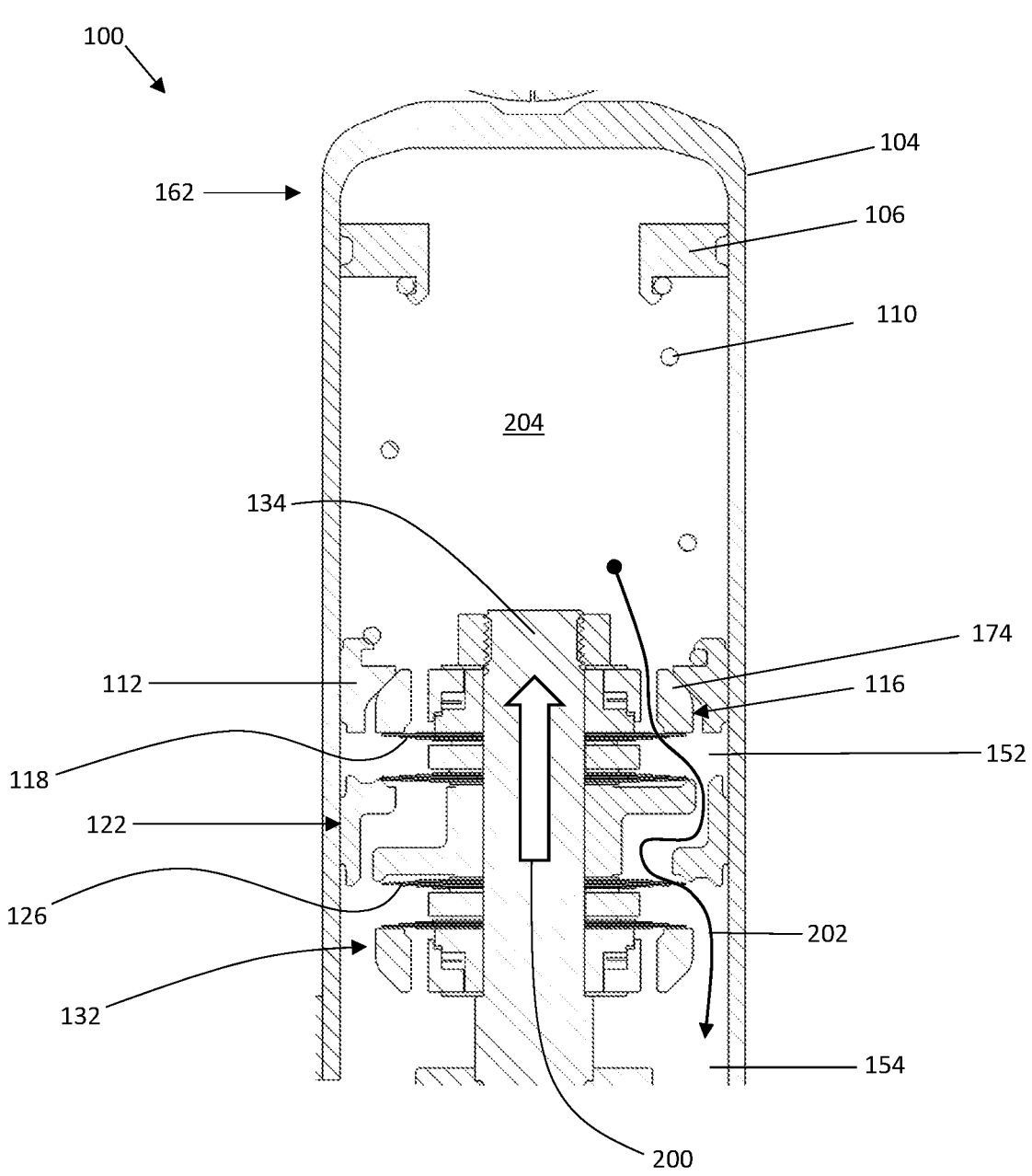
FIG. 3B is a cross-sectional view of an example vibration damper showing a second step in a sequence whereby an example end-stop control valve is engaged and then disengaged.

As shown in FIG. 3B, if the piston rod 134 is driven far enough into the damper tube 104, the JCO valve piston assembly 116, specifically, the JCO piston 174 thereof, engages and mates with the JCO catch piston 112 to form a seal. At this point, hydraulic fluid is sealed in a third working chamber 204, which in FIG. 3B is above the JCO catch piston 112. More details regarding flow through the JCO valve piston assembly 116 will be provided further below, but for now suffice it to say that the hydraulic fluid passes from the third working chamber 204 through the JCO valve piston assembly 116, deflecting the JCO valve disc stack-up 118 thereof, into the first working chamber 152 above the main piston 122, through the main piston 122, deflecting the valve discs 126 thereof, and into the second working chamber 154, as again represented by a flow path 202. Because the hydraulic fluid is passing through both the main piston 122 and the JCO valve piston assembly 116, the damping force provided by the deflection of the JCO valve disc stack-up 118 of the JCO valve piston assembly 116 is additive to the damping force provided by the deflection of the valve discs 126 of the main piston 122.

Figure 3C:
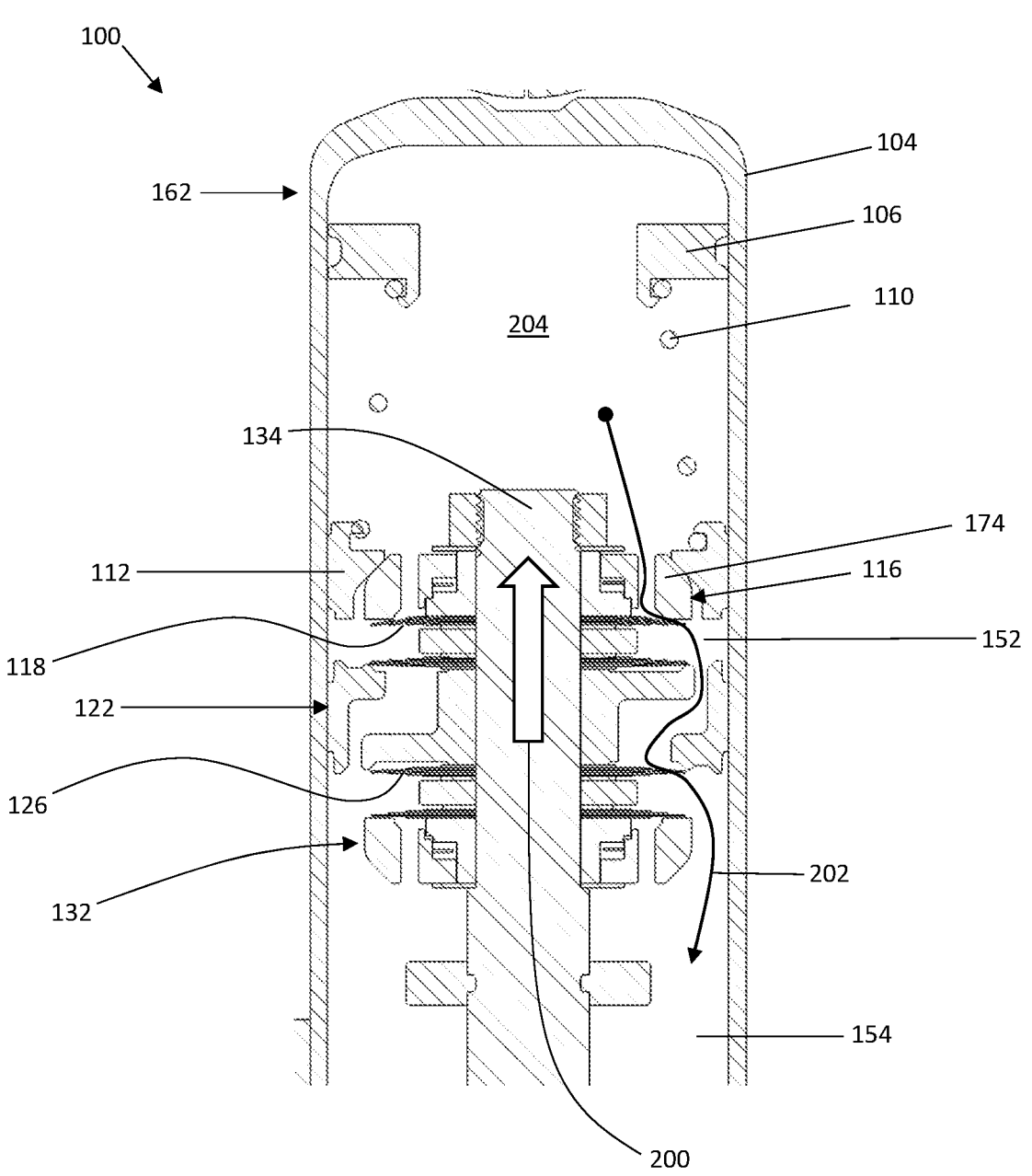
FIG. 3C is a cross-sectional view of an example vibration damper showing a third step in a sequence whereby an example end-stop control valve is engaged and then disengaged.

As reflected in FIG. 3C, as the compression stroke continues, the volume of the third working chamber 204 becomes smaller as the JCO catch piston 112 and the JCO valve piston assembly 116 move closer to the first end 162 of the damper tube 104. The JCO valve disc stack-up 118 deflects even more as the pressure of the hydraulic fluid in the third working chamber 204 builds, thereby providing an increasing amount of damping force.

Figure 3D:
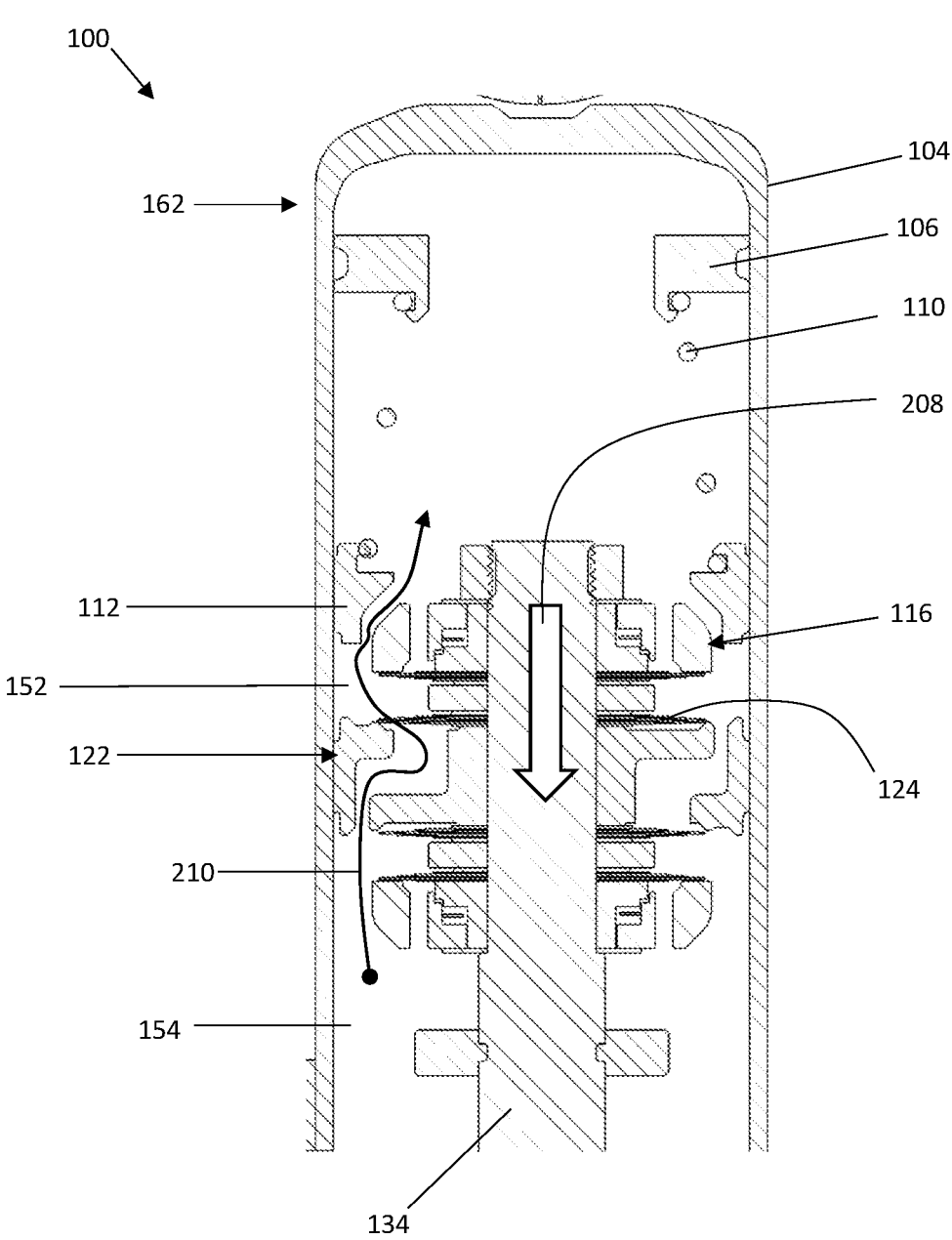
FIG. 3D is a cross-sectional view of an example vibration damper showing a fourth step in a sequence whereby an example end-stop control valve is engaged and then disengaged.

Immediately following the end of the compression stroke, the JCO valve piston assembly 116 disengages from the JCO catch piston 112 as the piston rod 134, the JCO valve piston assembly 116, the main piston 122, and other components disposed along the piston rod 134 begin moving away from the first end 162 of the damper tube 104, as shown by a downward-pointing arrow 208 in FIG. 3D. Consequently, as reflected by a flow path 210, hydraulic fluid flows from the second working chamber 154 through the main piston 122, deflecting the valve discs 124 thereof, into the first working chamber 152 and around the JCO valve piston assembly 116. The third working chamber ceases to exist due to the separation of the JCO valve piston assembly 116 from the JCO catch piston 112. The JCO spring 110 then returns the JCO catch piston 112 to its longitudinal starting position.

One having ordinary skill in the art would understand how hydraulic fluid may flow similarly in a rebound stroke involving the RCO valve piston assembly 132 and the RCO catch piston 136.

Figure 4:
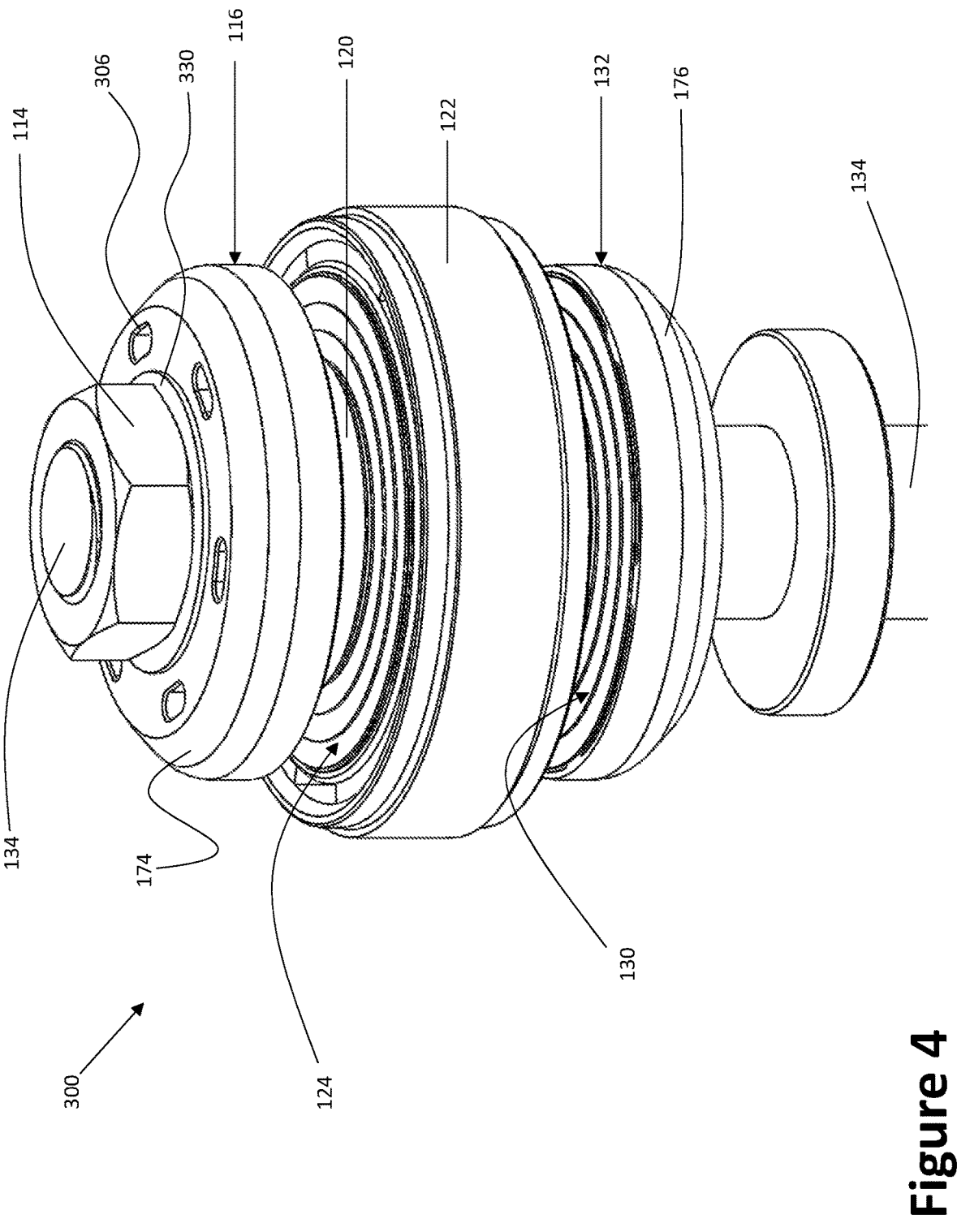
FIG. 4 is a perspective view of an example assembly involving multiple pistons disposed at a distal end of a piston rod.
Figure 5:
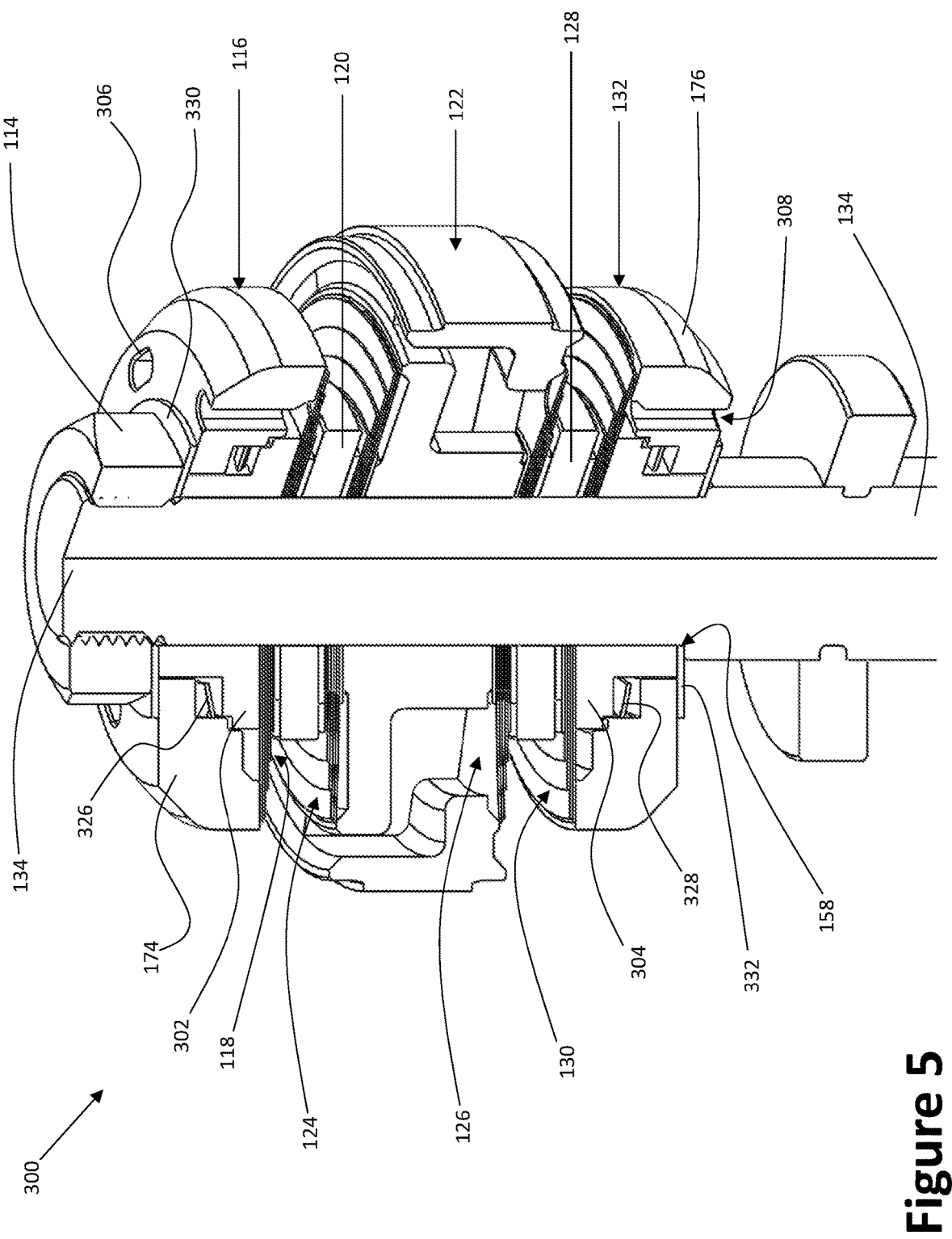
FIG. 5 is a 135° cutaway view of the example assembly shown in FIG. 4.
Figure 6:
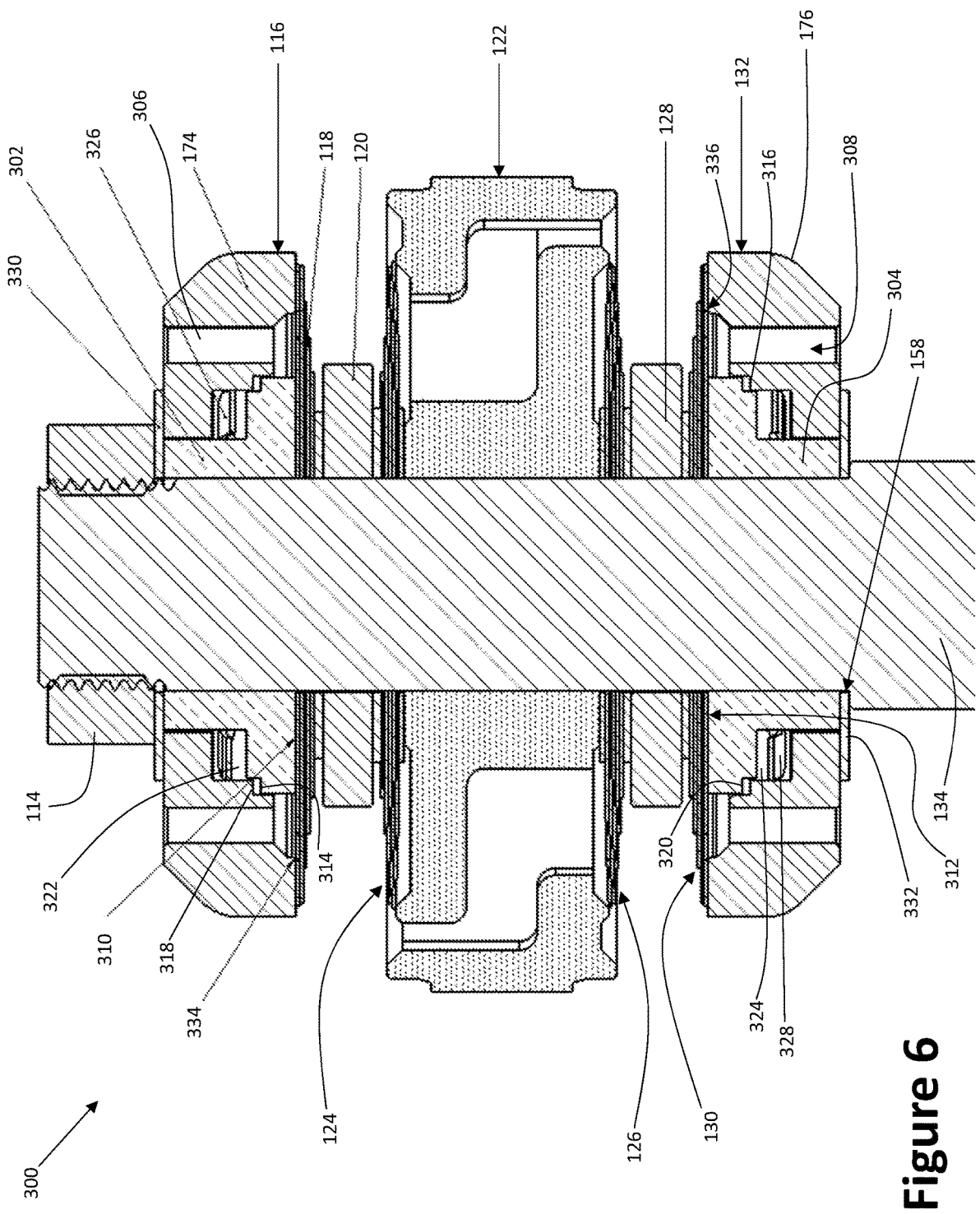
FIG. 6 is a cross-sectional view of the example assembly shown in FIGS. 4 and 5.
Figure 7:
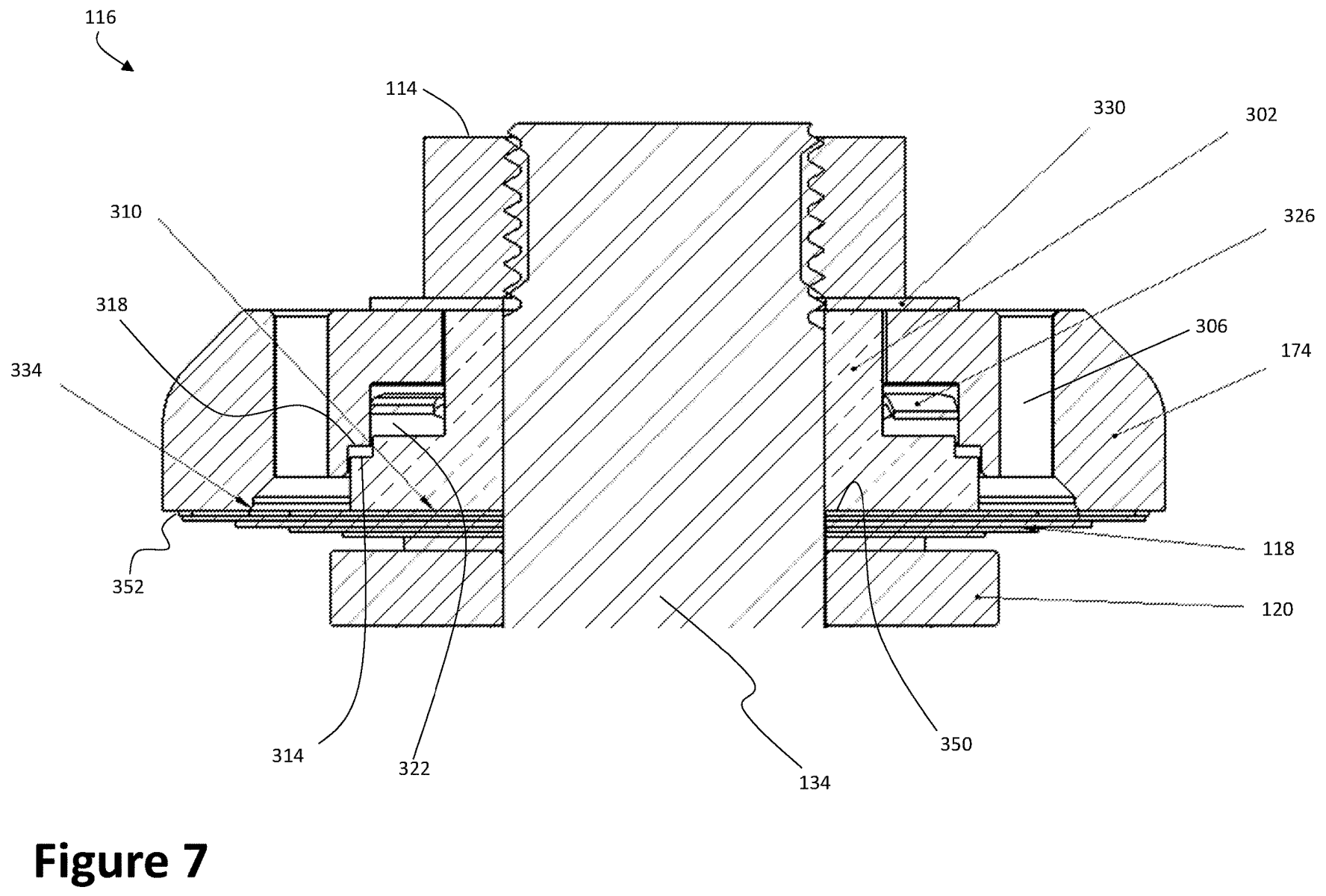

Turning now to FIGS. 4-7, a free or distal end 300 of the piston rod 134 is shown in more detail, with FIG. 4 providing a perspective view, FIG. 5 providing a cutaway view, and FIG. 6 providing a cross-sectional view through the distal end 300. FIG. 7 provides a cross-sectional detail view of the example JCO valve piston assembly 116 on the distal end 300 in particular. While more focus may be placed on the JCO valve piston assembly 116 here, those having ordinary skill in the art will appreciate how the teachings may apply with equal force to the RCO valve piston assembly 132.

Building upon without repeating the disclosure above, in some examples each valve piston assembly 116, 132 may generally include the piston 174, 176; a valve piston insert 302, 304; and the valve disc stack-up 118, 130. Each piston 174, 176 may include passages 306, 308 that extend longitudinally through the piston 174, 176 and through which hydraulic fluid can flow. In some cases, the passages 306, 308 may have circular cross-sections when viewed from a longitudinal perspective. In other cases, though, the passages 306, 308 may be elongated circumferentially, as can be seen in FIGS. 4 and 5. The valve piston inserts 302, 304 may be arranged radially inward relative to the pistons 174, 176. Further, hubs 310, 312 of the valve piston inserts 302, 304 may serve as bases or support surfaces for the respective valve disc stack-ups 118, 130.

While the valve piston inserts 302, 304, amongst other components, may be fixed longitudinally along the piston rod 134 between the piston rod assembly fastener 113 and the shoulder 158, the pistons 174, 176 may move longitudinally relative to the respective valve piston inserts 302, 304, as will be described in more detail below. The valve piston inserts 302, 304 may each include a shoulder 314, 316 that opposes and, at times, contacts a seat 318, 320 of each piston 174, 176. The shoulders 314, 316 are longitudinally spaced apart, respectively, from the seats 318, 320 when the pistons 174, 176 are not engaged with the respective catch pistons 112, 136.

In some examples such as that shown in FIGS. 4-7, the valve piston inserts 302, 304 and the pistons 174, 176 may be sized and shaped so as to form annular voids 322, 324 longitudinally and radially between the respective pairs of the valve piston inserts 302, 304 and the pistons 174, 176. Wave springs 326, 328 may be inserted in the annular voids 322, 324. The wave springs 326, 328 serve to longitudinally separate the pistons 174, 176, respectively, from the valve piston inserts 302, 304 after end-of-stroke damping events.

In addition, retention discs 330, 332 may be utilized not only to help spread the load imparted, respectively, by the piston rod assembly fastener 114 and the shoulder 158, but also to maintain longitudinal alignment between the pistons 174, 176 and the respective valve piston inserts 302, 304 when the valve piston assemblies 116, 132 are disengaged from the respective catch pistons 112, 136.

Each piston 174, 176 may have a valve seat 334, 336 that extends annularly around the piston rod 134 and is configured, at least selectively, to form a seal with the respective valve disc stack-ups 118, 130. Each valve seat 334, 336 may be chamfered or radiused. As one having ordinary skill in the art will appreciate, especially in light of the discussion below, such chamfers or radiuses accommodate preload of the valve disc stack-ups 118, 130; help form a better seal with the valve disc stack-ups 118, 130; facilitate better control over the flow of hydraulic fluid; and enable smooth deformation of the valve disc stack-ups 118, 130 during end-of-stroke damping.

Typically, at least with respect to conventional pistons, the term "preload" describes the position of the valve disc stack-up relative to the valve seat and hence the extent to which a valve disc stack-up is deformed (if any) in a steady state, prior to any damping movement. In the present disclosure, however, the preload of the valve piston assembly, specifically, of the valve disc stack-up, varies over at least part of the course of the end-of-stroke damping. Hence the present disclosure will distinguish between the terms "initial preload" and "maximum preload."

With respect to FIG. 7, the example JCO valve piston assembly 116 is said to have zero initial preload because a top surface 350 (at the piston rod 134) of a valve disc 352 of the JCO valve disc stack-up 118 that is in contact with the valve seat 334 is positioned at a same longitudinal location as the valve seat 334 of the JCO piston 174 when the vibration damper 100 is in a steady state. If the top surface 350 of the valve disc 352 were 0.25 mm higher (longitudinally) at the piston rod 134 than at the valve seat 334, then there would be 0.25 mm of initial preload and at least the valve disc 352 would be slightly deformed before any damping even begins. Conversely, if the top surface 350 of the valve disc 352—and thus the entire disc 352—were 0.1 mm lower (longitudinally) than the valve seat 334, then there would be negative 0.1 mm of initial preload, which in some cases may also be referred to as bypass. Greater preload requires greater force to deflect and thereby open the JCO valve disc stack-up 118 to permit hydraulic fluid to pass through the JCO valve piston assembly 116. Those having ordinary skill in the art will appreciate that valve piston assemblies can be tuned with different levels of initial and maximum preload depending on the application of the vibration damper.

The two-part nature of—and hence the longitudinal spacing between—the piston and the valve piston insert enables the progressive nature of the end-of-stroke damping force of the present disclosure. Rather than being stuck with a fixed amount of preload as in conventional pistons, the valve piston assemblies of the present disclosure gradually increase preload (i.e., from initial preload to maximum preload) during the end-of-stroke damping. This concept is explained further with respect to FIGS. 8A-8E.

Figure 8A:
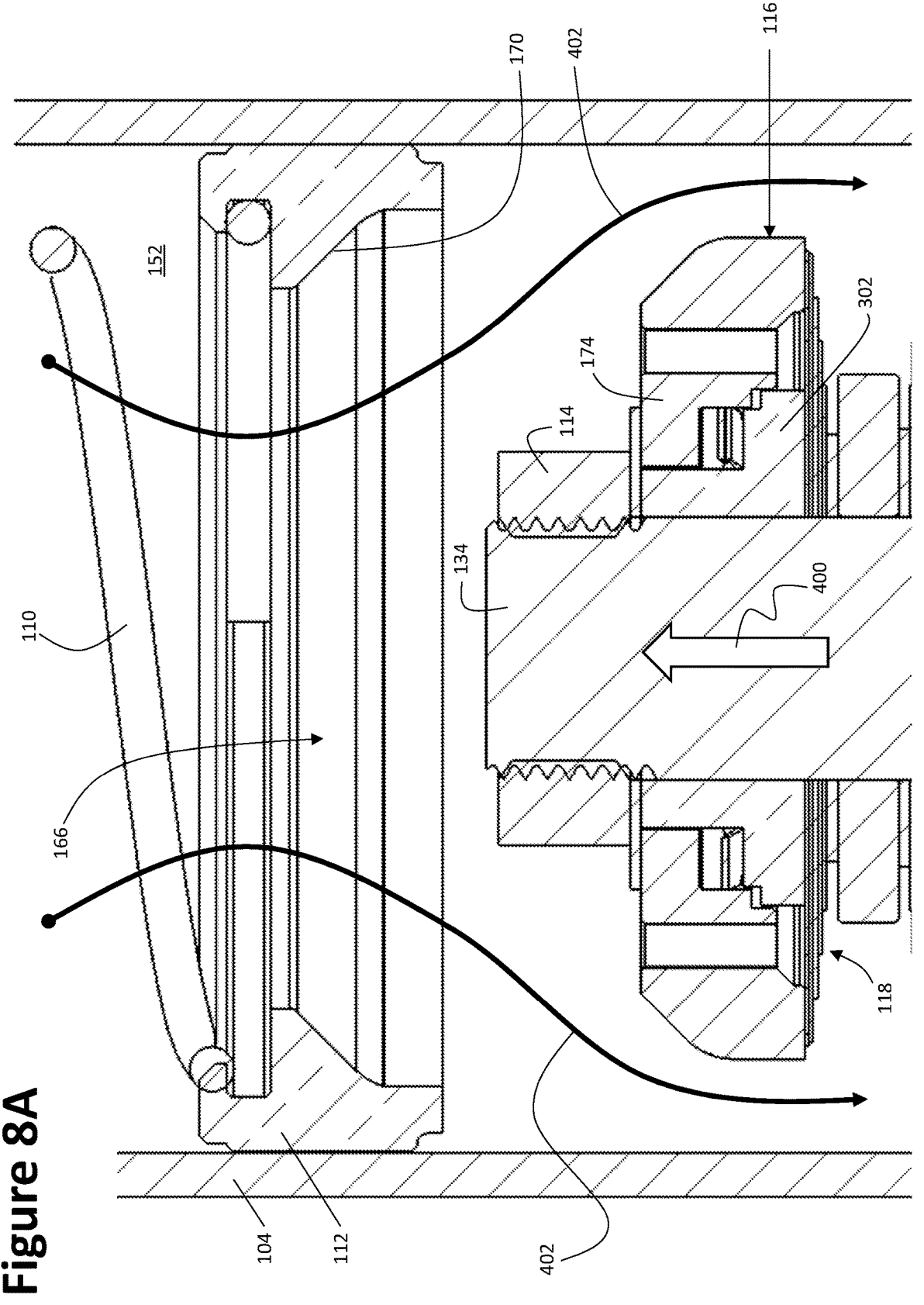
FIG. 8A is a is a cross-sectional view showing a first step in a sequence whereby an example end-stop control valve is engaged and then disengaged.

In FIG. 8A, the piston rod 134 is being driven in a compression stroke, as represented by an arrow 400, towards the JCO catch piston 112 and the first end 162 of the damper tube 104. Following a flow path 402, hydraulic fluid can flow through the main opening 166 of the JCO catch piston 112, bypassing the JCO valve piston assembly 116, which has not yet engaged with the JCO catch piston 112, and through the main piston 122 and onto the second working chamber 154. The force output of the vibration damper 100 is attributable to the main piston 122 and its valve discs 126, as shown more generally in FIG. 3A.

Figure 8B:
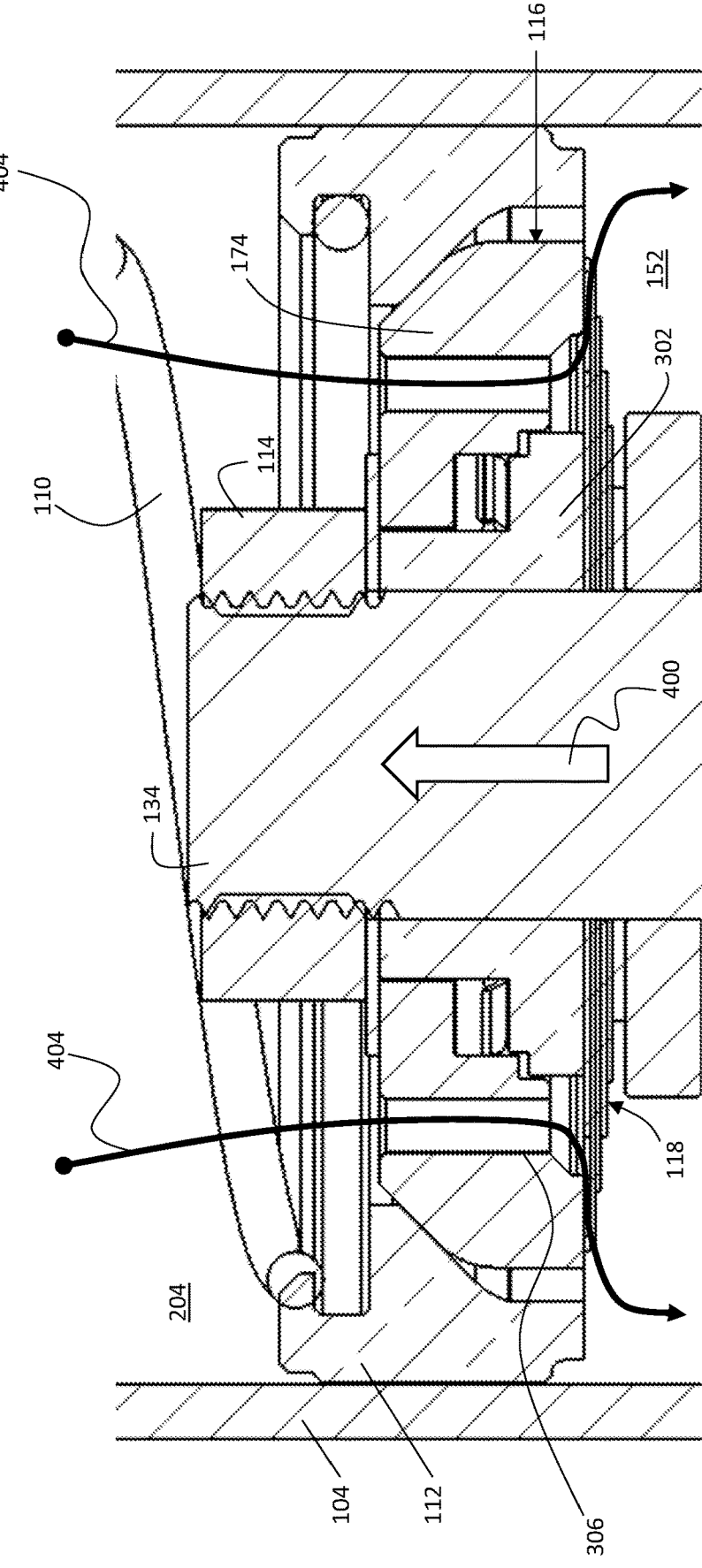
FIG. 8B is a is a cross-sectional view showing a second step in a sequence whereby an example end-stop control valve is engaged and then disengaged.

FIG. 8B shows the point in time during compression at which the JCO piston 174 makes contact with and engages the JCO catch piston 112 to form a seal and close off the main opening 166 of the JCO catch piston 112. At this point, the third working chamber 204 is created above the JCO catch piston 112. The JCO piston 174 begins to carry the JCO catch piston 112 towards the first end 162 of the damper tube 104 as the JCO spring 110 provides a negligible amount of resistance. Since in this example the JCO valve disc stack-up 118 has zero initial preload, the JCO valve disc stack-up 118 must deflect at least to some degree to permit hydraulic fluid to pass from the third working chamber 204 into the first working chamber 152, as shown by a flow path 404. Alternatively, in other examples where negative initial preload or bypass exists between the valve disc stack-up and the valve seat, hydraulic fluid may still flow freely through the valve piston assembly, at least temporarily. FIG. 3B generally corresponds to this stage in FIG. 8B at which the JCO piston 174 makes contact with and engages the JCO catch piston 112, although FIG. 3B shows flow through the main piston 122 and the damper tube 104 more generally.

Figure 8C:
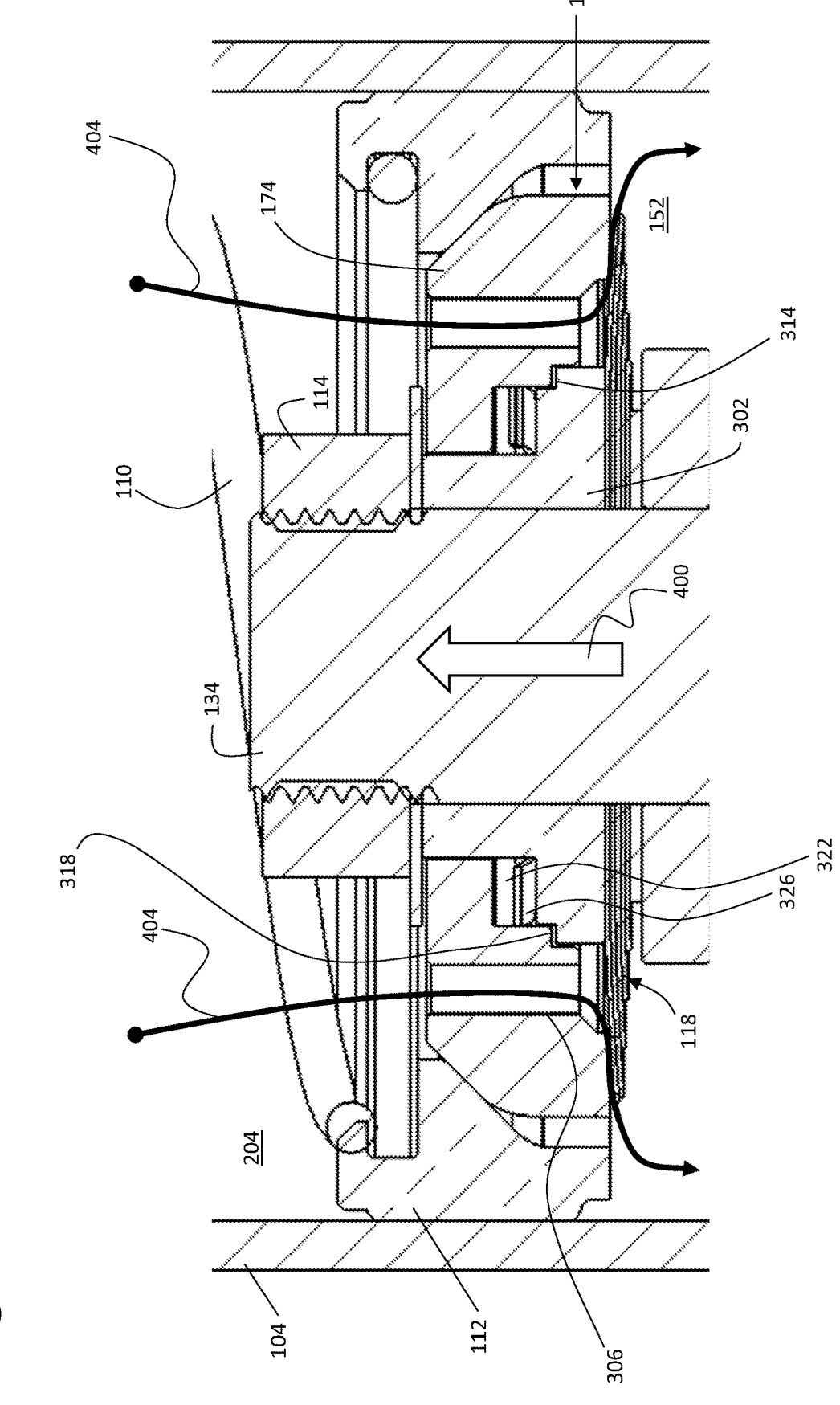
FIG. 8C is a is a cross-sectional view showing a third step in a sequence whereby an example end-stop control valve is engaged and then disengaged.

FIG. 8C illustrates how the longitudinal spacing between the JCO piston 174 and the JCO valve piston insert 302 shrinks as the piston rod 134 continues its compression stroke. The resistance provided by the hydraulic fluid trapped in the third working chamber 204 causes the JCO catch piston 112 and the JCO piston 174 to move longitudinally towards the JCO valve piston insert 302, which is securely fixed on the piston rod 134. As the piston rod 134 advances into the third working chamber 204, the JCO piston 174 also compresses, moving the valve seat 334 of the JCO piston 174 into/towards the JCO valve disc stack-up 118. As this longitudinal spacing between the JCO piston 174 and the JCO valve piston insert 302 decreases, preload is introduced to the JCO valve disc stack-up 118, which then progressively increases the JCO valve disc stack-up 118 stiffness. To be sure, FIG. 8C shows some early deflection in the JCO valve disc stack-up 118 as well as closer proximity of the shoulder 314 and the seat 318.

Figure 8D:
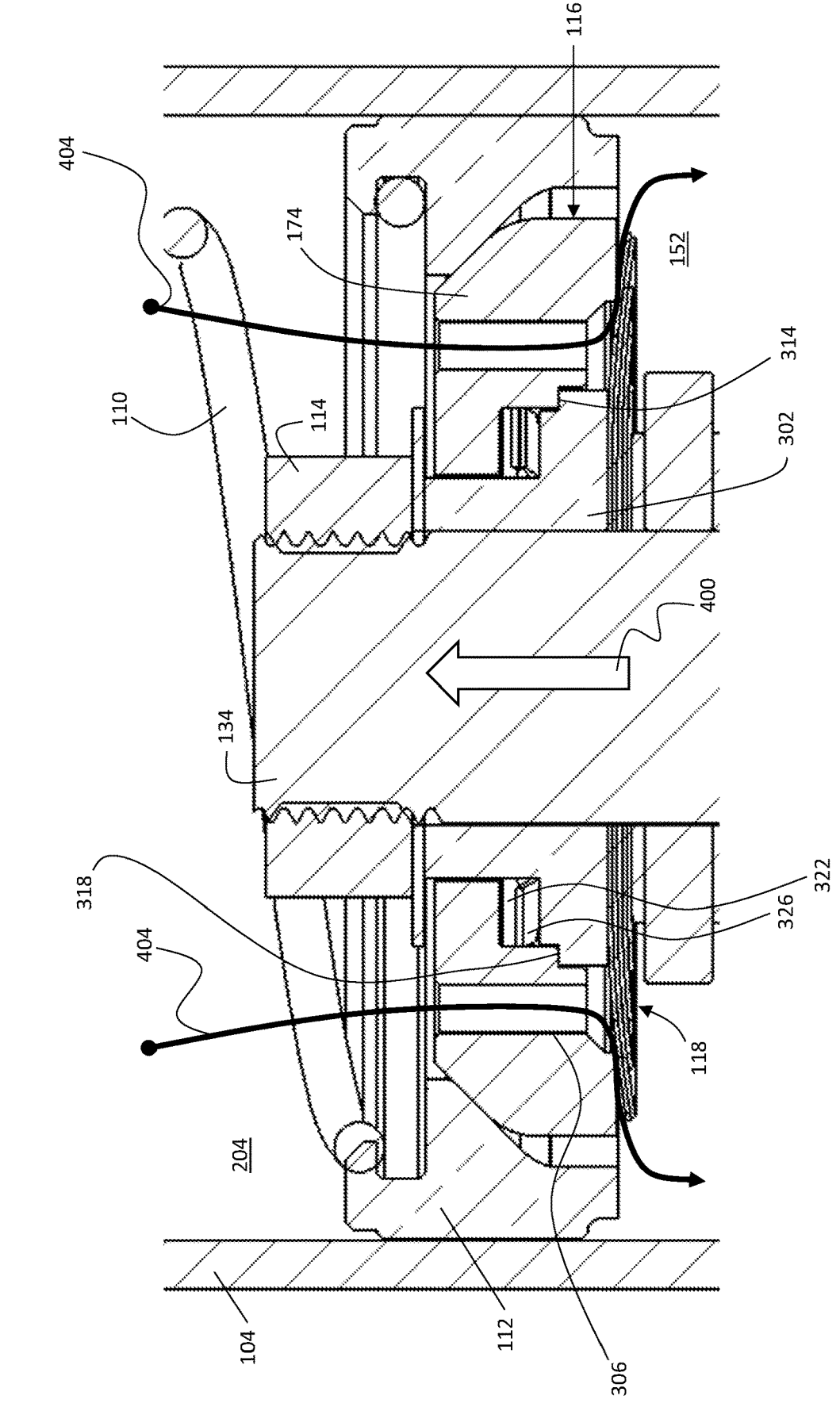
FIG. 8D is a is a cross-sectional view showing a fourth step in a sequence whereby an example end-stop control valve is engaged and then disengaged.

Eventually the shoulder 314 and the seat 318 contact one another, as shown in FIG. 8D. At this point, the JCO valve disc stack-up 118 of the JCO valve piston assembly 116 has reached maximum preload, which provides greater resistance. Put another way, the maximum amount of preload is not present initially, but is reached only after a portion of the end-of-stroke damping event. By varying the preload during an end-of-stroke damping event, the damper output force transitions significantly more smoothly into a condition where supplemental damping (i.e., in addition to damping provided by the main piston 122) is provided by one of the valve piston assemblies. Also, in the state shown in FIG. 8D, the wave spring 326 is compressed at least to some degree within the annular void 322. FIG. 3C loosely corresponds to the stages shown in FIGS. 8C and 8D, although FIG. 3C shows flow through the main piston 122 and the damper tube 104 more generally.

Figure 8E:
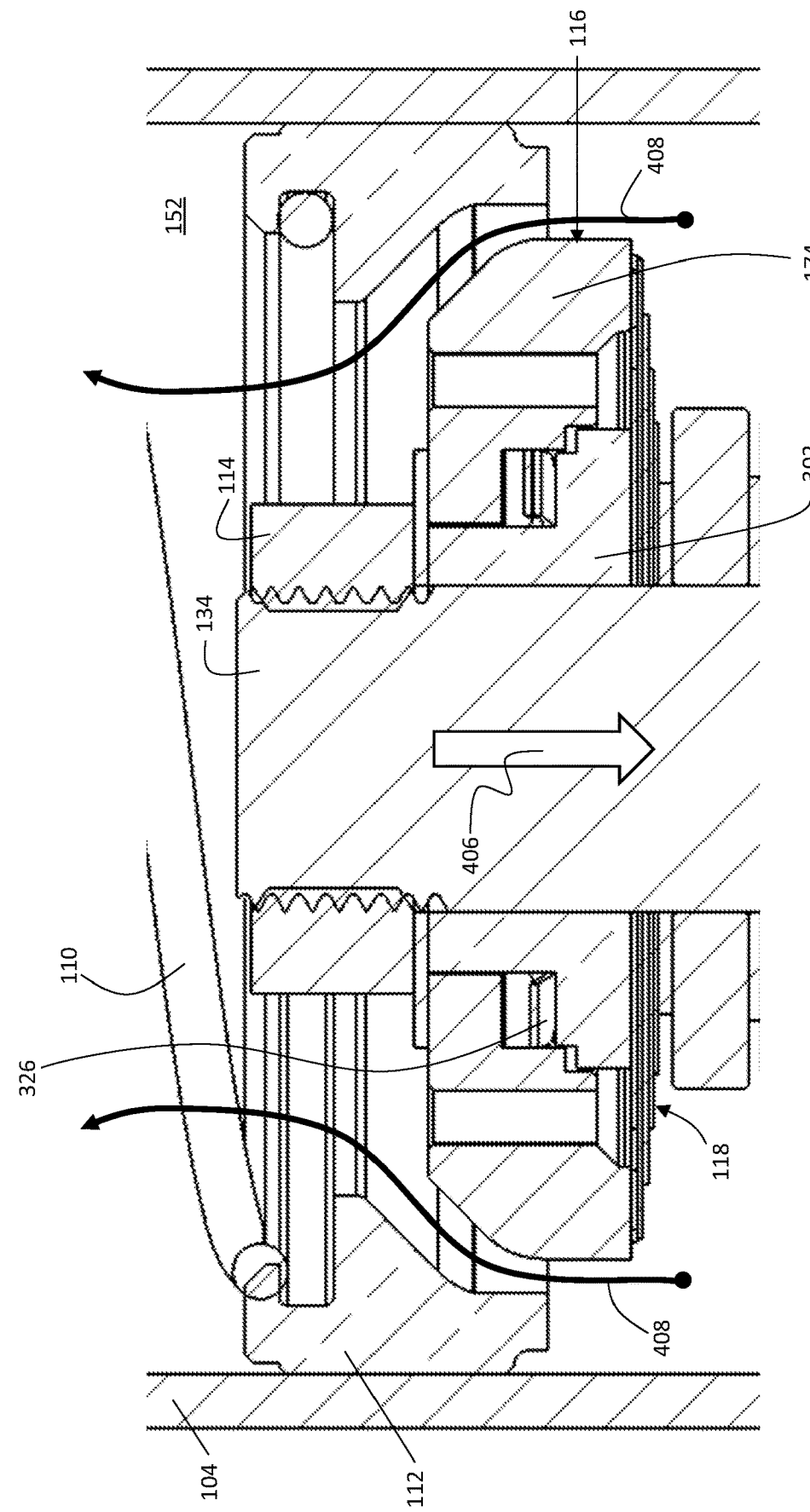
FIG. 8E is a is a cross-sectional view showing a fifth step in a sequence whereby an example end-stop control valve is engaged and then disengaged.

Once the JCO valve piston assembly 116 and the piston rod 134 have completed the end stop compression stroke, the piston rod 134 reverses directions and begins moving away from the first end 162 of the damper tube 104, as shown figuratively in FIG. 8E by an arrow 406. At this point, the JCO piston 174 separates from the JCO catch piston 112, the wave spring 326 pushes the JCO piston 174 and the JCO valve piston insert 302 longitudinally apart, the JCO valve disc stack-up 118 returns to a state of zero initial preload (at least in this example), the third working chamber 204 ceases to exist, and hydraulic fluid can flow freely through the main opening 166 of the JCO catch piston 112 and around the JCO valve piston assembly 116, as represented by a flow path 408. FIG. 3D generally corresponds to the stage shown in FIG. 8E, although FIG. 3D shows flow through the main piston 122 and the damper tube 104 more generally.

It should be understood that in some cases the terms "end-stop control valve" or "auxiliary piston" may be used to refer to the components that provide end-of-stroke damping, such as the catch piston and the valve piston assembly. Furthermore, it should be understood that the examples disclosed herein are non-limiting. For instance, in many applications a vibration damper may only have one of the end-stop control valves, as opposed to two, at opposite ends of the damper tube. As another example, in some cases a piston may be fixed to the piston rod and the valve piston insert may be longitudinally movable relative to the piston.

Figure 9:
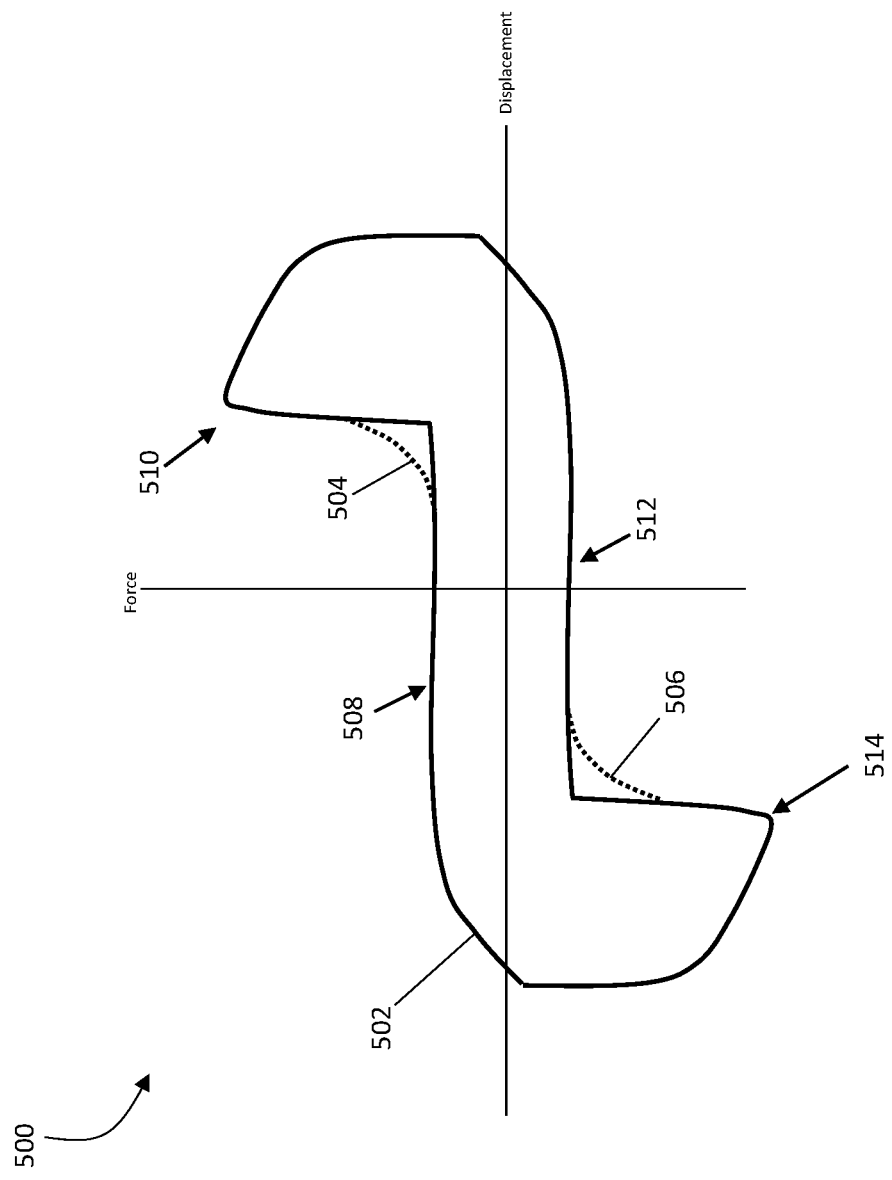
FIG. 9 is a graph showing force-versus-displacement curves for a conventional vibration damper relative to an example vibration damper of the present disclosure.

Turning now to FIG. 9, a graph 500 plots damper output force versus displacement of the piston rod. A solid line 502 represents the behavior of a vibration damper without the benefit of the end-stop control valves disclosed herein, whereas dotted lines 504, 506 represent the modified behavior of a vibration damper that includes such end-stop control valves. In general, reference character 508 corresponds to output from the main piston during rebound, reference character 510 corresponds to output from the main piston with the assistance of an RCO end-of-stroke damping force, reference character 512 corresponds to output from the main piston during jounce or compression, and reference character corresponds to output from the main piston with the assistance of a JCO end-of-stroke damping force. One having ordinary skill in the art will appreciate how a smoother transition into end-of-stroke damping can drastically improve NVH characteristics.

Figure 10:
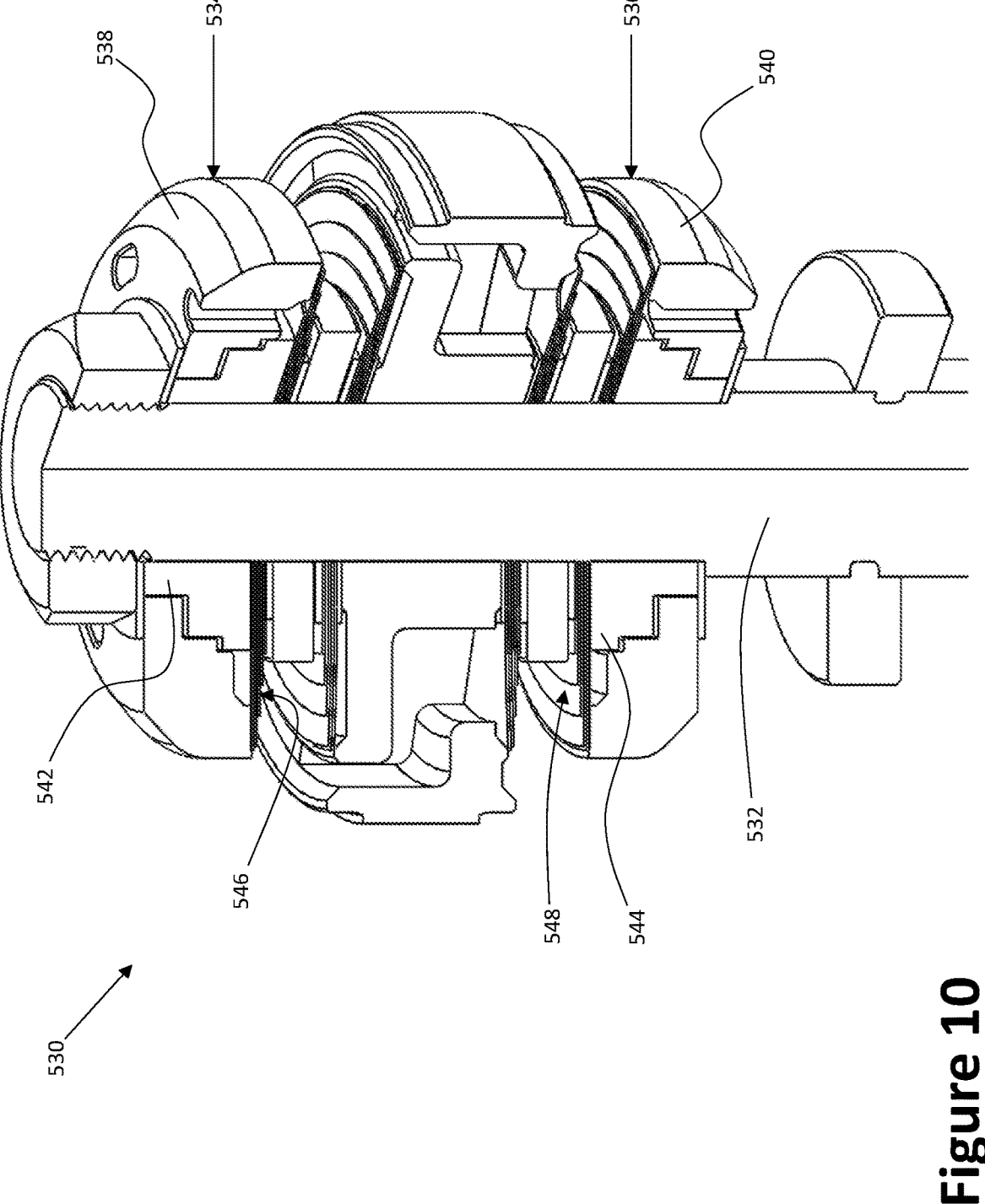
FIG. 10 is a 135° cutaway view of another example assembly involving multiple pistons disposed at a distal end of a piston rod.

With respect to FIG. 10, another example distal end 530 of a piston rod 532 is shown. In this example and those that follow, only the differences relative to the vibration damper 100 will be discussed. Here, in the example of FIG. 10, a JCO valve piston assembly 534 and a RCO valve piston assembly 536 each include a piston 538, 540 and a valve piston insert 542, 544. However, unlike the valve piston assemblies disclosed above, an annular void that is big enough to accommodate a wave spring is not included here. Instead, positive initial preload that is introduced into valve disc stack-ups 546, 548 serves the purpose of pushing the piston 538, 540 away from the respective valve piston insert 542, 544 to create space longitudinally between the components. In other words, because the valve disc stack-ups 546, 548 are elastically deformed by the initial preload, even before any engagement with a catch piston, the valve disc stack-ups 546, 548 naturally push the pistons 538, 540 away, respectively, from the valve piston inserts 542, 544.

Figure 11:
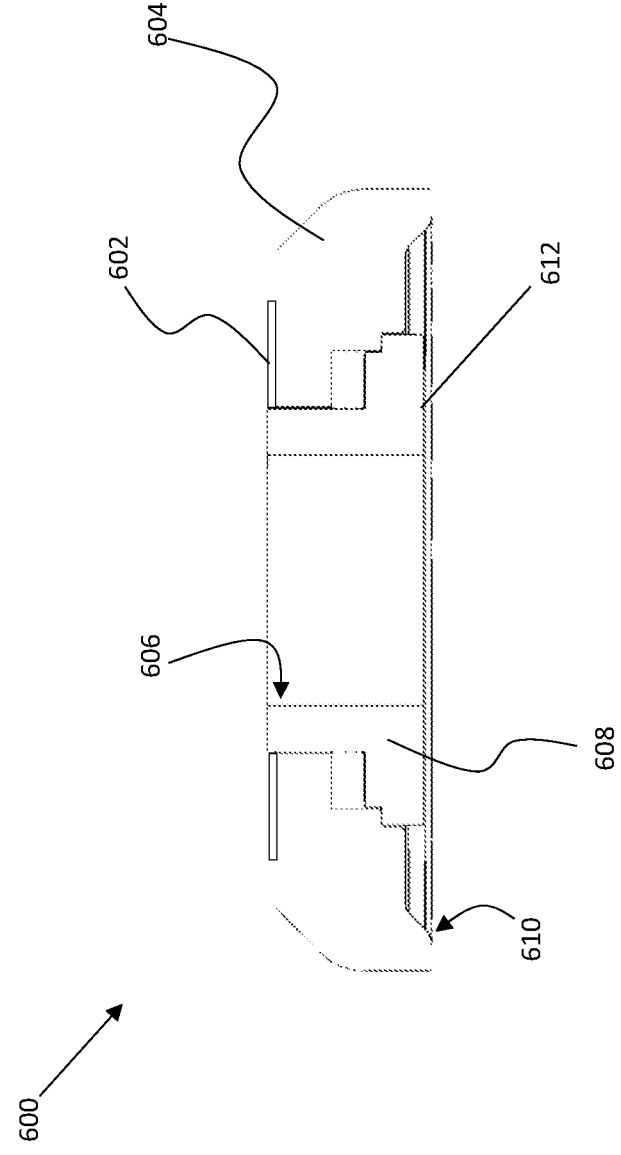
FIG. 11 is a cross-sectional view of an example piston.

FIG. 11 shows an example valve piston assembly 600, or at least part thereof, that includes a spacer disc 602 disposed above a piston 604 and around a top 606 of a valve piston insert 608. The spacer disc 602 exemplifies one way to introduce more initial preload into an assembly without the need to manufacture additional components or remanufacture certain components. In particular, the spacer disc 602 introduces more initial preload because the spacer disc 602 positions a valve seat 610 on the piston 604 farther away from a hub 612 of the valve piston insert 608.

Figure 12:
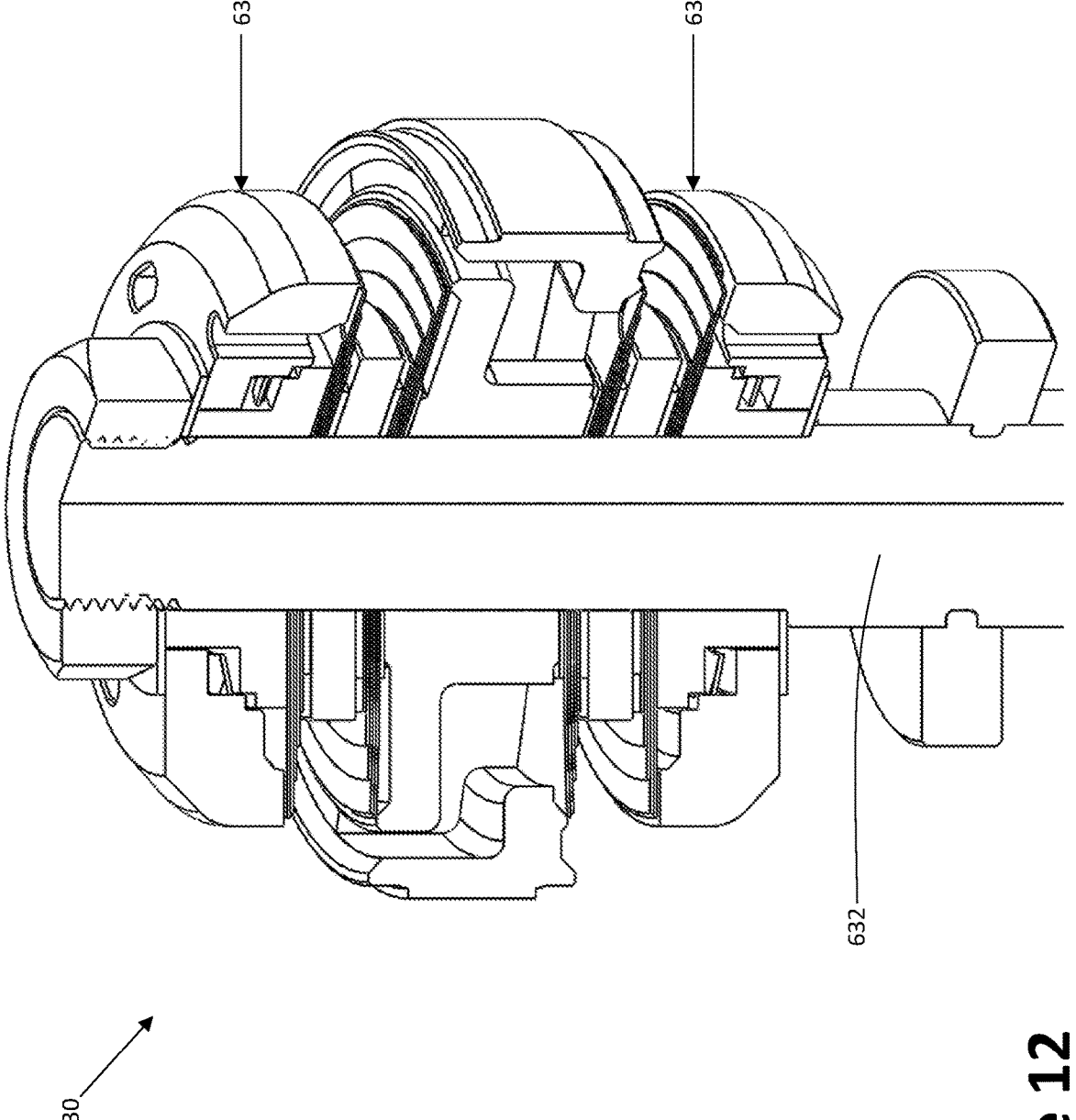
FIG. 12 is a 135° cutaway view of still another example assembly involving multiple pistons disposed at a distal end of a piston rod.

FIG. 12 shows still another example distal end 630 of a piston rod 632. In the example shown in FIG. 12, a JCO valve piston assembly 634 and an RCO valve piston assembly 636 each has negative 0.1 mm of initial preload.

Figure 13:
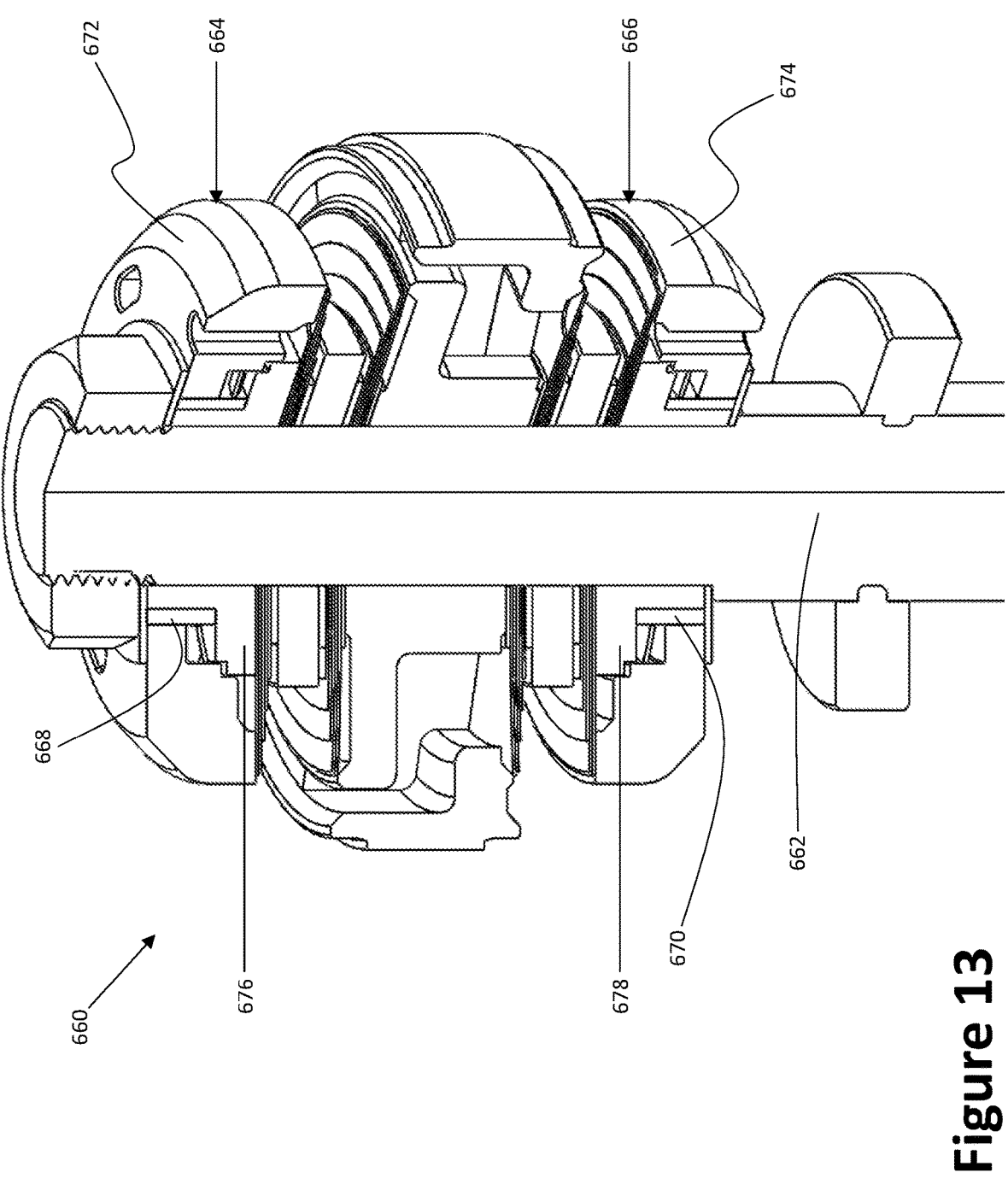
FIG. 13 is a 135° cutaway view of yet another example assembly involving multiple pistons disposed at a distal end of a piston rod.

The example shown in FIG. 13 features another distal end 660 of a piston rod 662. In this example, a JCO valve piston assembly 664 and an RCO valve piston assembly 666 each has a bushing 668, 670 disposed radially between a respective piston 672, 674 and a respective valve piston insert 676, 678. The bushings 668, 670 help further improve NVH characteristics, especially at the respective points at which the pistons 672, 674 engage with catch pistons.

Figure 14:
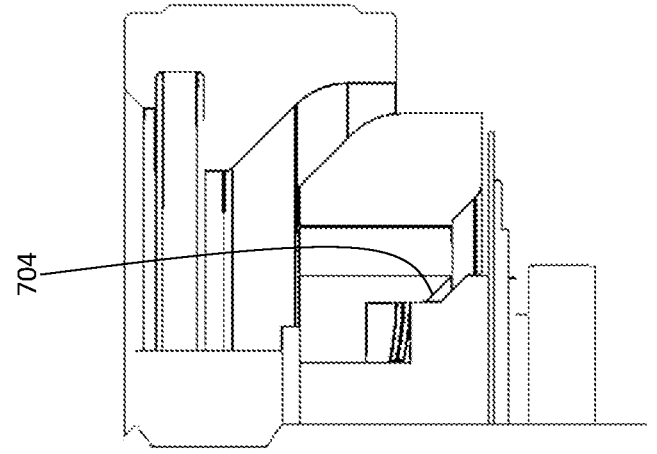
FIG. 14 is a cross-sectional view of another example auxiliary piston.
Figure 14:
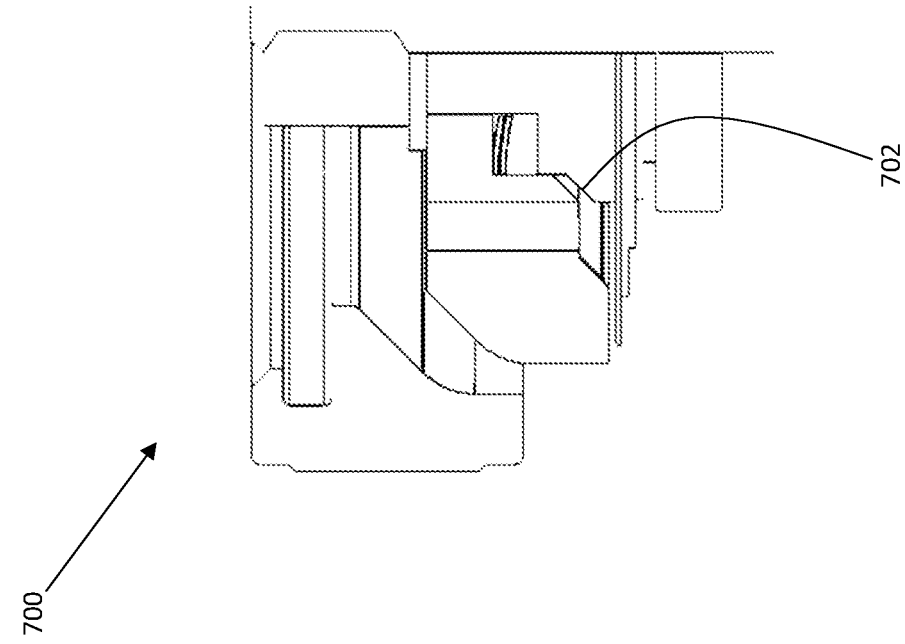

FIG. 14 shows an example end-stop control valve 700 that includes a shoulder 702 and a seat 704 that are transverse, rather than perpendicular, to a longitudinal axis.

What is claimed is:

1. An end-stop control valve comprising:
   a. a piston that is configured to move longitudinally within a damper tube, the piston having a valve seat;
   b. a valve piston insert, wherein at one or more longitudinal locations a portion of the valve piston insert is disposed radially within the piston, wherein the piston is longitudinally movable relative to the valve piston insert in an assembled state of the end stop control valve;
   c. a valve disc stack-up, wherein a radially inner portion of the valve disc stack-up is supported on a hub of the valve piston insert and a radially outer portion of the valve disc stack-up is supported on the valve seat of the piston; and
   d. a catch piston with which the piston engages during an end-of-stroke damping event, wherein during the end-of-stroke damping event, pressure exerted by hydraulic fluid forces the valve disc stack-up off the valve seat,
   e. wherein the piston and the valve piston insert are configured such that, during the end-of-stroke damping event, a preload of the valve-disc stack-up, which is based on a longitudinal distance between the valve seat and the valve hub, increases from an initial preload to a maximum preload during the end-of-stroke damping event;
   f. wherein in a steady state where the piston is disengaged from the catch piston a seat of the piston is longitudinally spaced apart from a shoulder of the valve piston insert, wherein the seat of the piston and the shoulder of the valve piston insert are configured to contact one another during the end-of-stroke damping event.

2. The end-stop control valve of claim 1 wherein the maximum preload is present when the seat of the piston is in contact with the shoulder of the valve piston insert, wherein the end-stop control valve is configured to provide more damping force at the maximum preload than at the initial preload.

3. The end-stop control valve of claim 1 wherein the valve disc stack-up is configured to contact the valve seat of the piston, wherein the valve disc stack-up, the valve piston insert, and the piston are configured such that greater force is required to deflect the valve disc stack-up away from the valve seat at the maximum preload than at the initial preload.

4. The end-stop control valve of claim 1 wherein at the maximum preload during the end-of-stroke damping event the radially inner portion of the valve disc stack-up is longitudinally closer to a longitudinal midpoint of the piston than at the initial preload.

5. The end-stop control valve of claim 1 comprising a wave spring that is disposed in an annular void that exists longitudinally and radially between the piston and the valve piston insert, wherein the wave spring is compressed longitudinally during the end-of-stroke damping event, wherein the wave spring is configured to force the piston and the valve piston insert longitudinally apart after the end-of-stroke damping event when the piston and the catch piston disengage.

6. The end-stop control valve of claim 1 wherein the valve disc stack-up is elastically deformed at the initial preload, wherein the valve disc stack-up is configured to force the piston and the valve piston insert longitudinally apart after the end-of-stroke damping event when the piston and the catch piston disengage.

7. The end-stop control valve of claim 1 wherein upon engagement of the piston and the catch piston a seal is formed between the piston and the catch piston, wherein the seal is configured to force hydraulic fluid to pass through passages that extend from a first longitudinal side of the piston to a second longitudinal side of the piston that is opposite the first longitudinal side, wherein a contour of each passage is elongated circumferentially.

8. The end-stop control valve of claim 1 comprising a retention disc disposed at a first longitudinal side of the valve piston insert and a first longitudinal side of the piston, wherein the retention disc is configured to longitudinally align the first longitudinal sides of the valve piston insert and the piston in a steady state where the piston is disengaged from the catch piston.

9. A vibration damper comprising:
   a. a damper tube that contains hydraulic fluid;
   b. a main piston that is secured on a piston rod and divides an interior of the damper tube into a first working chamber and a second working chamber; and
   c. an end-stop control valve disposed in the first working chamber, the end-stop control valve comprising:
   d. an auxiliary piston that is arranged on the piston rod and is configured to move longitudinally within the damper tube, the auxiliary piston having a valve seat,
   e. a valve piston insert, wherein at one or more longitudinal locations along the piston rod within the damper tube a portion of the valve piston insert is disposed radially within the auxiliary piston, wherein the auxiliary piston is longitudinally movable relative to the valve piston insert in an assembled state of the vibration damper,
   f. a valve disc stack-up disposed on the piston rod, wherein a radially inner portion of the valve disc stack-up is supported on a hub of the valve piston insert and a radially outer portion of the valve disc stack-up is supported on the valve seat of the auxiliary piston, and
   g. a catch piston disposed within the damper tube, wherein the auxiliary piston is configured to engage the catch piston and form a seal between the auxiliary piston and the catch piston during an end-of-stroke damping event,
   h. wherein the auxiliary piston and the valve piston insert are configured such that a longitudinal distance between the valve seat and the valve hub increases during the end-of-stroke damping event, wherein a damping force provided by the end-stop control valve increases as the longitudinal distance between the valve seat and the valve hub increases during the end-of-stroke damping event;
   i. wherein the vibration damper further comprises a seal between a radial exterior of the catch piston and an inner wall of the damper tube, wherein a radial exterior of the auxiliary piston is spaced apart from the inner wall of the damper tube such that hydraulic fluid can bypass the auxiliary piston when the auxiliary piston is not engaged with the catch piston.

10. The vibration damper of claim 9 wherein engagement of the catch piston and the auxiliary piston forms a third working chamber between the catch piston and a first longitudinal end of the damper tube, wherein to exit the third working chamber hydraulic fluid must pass through the auxiliary piston.

11. The vibration damper of claim 9 wherein in a steady state prior to the end-of-stroke damping event the longitudinal distance between the valve seat and the valve hub is negative, meaning that the valve hub and thus the valve disc stack-up are spaced apart from the valve seat, wherein when the longitudinal distance between the valve seat and the valve hub is negative hydraulic fluid can flow through the end-stop control valve without elastically deforming the valve disc stack-up.

12. The vibration damper of claim 9 wherein in a steady state prior to the end-of-stroke damping event the longitudinal distance between the valve seat and the valve hub is positive, meaning that the valve disc stack-up is elastically deformed and is held against the valve seat of the auxiliary piston prior to the end-of-stroke damping event, wherein when the longitudinal distance between the valve seat and the valve hub is positive pressure exerted by hydraulic fluid must elastically deform the valve disc stack-up further and force the valve disc stack-up off the valve seat to flow through the end-stop control valve.

13. The vibration damper of claim 9 wherein at least one of:

a. the end-stop control valve comprises a wave spring that is disposed in an annular void that exists longitudinally and radially between the auxiliary piston and the valve piston insert, wherein the wave spring is compressed longitudinally during the end-of-stroke damping event, wherein the wave spring is configured to force the auxiliary piston and the valve piston insert longitudinally apart after the end-of-stroke damping event when the auxiliary piston and the catch piston disengage; or b. in a steady state prior to the end-of-stroke damping event the valve disc stack-up is elastically deformed due to the longitudinal distance between the valve seat and the valve hub, wherein the valve disc stack-up is configured to force the auxiliary piston and the valve piston insert longitudinally apart after the end-of-stroke damping event when the auxiliary piston and the catch piston disengage.

14. A vibration damper comprising:

a. a damper tube that contains hydraulic fluid;

b. a main piston that is secured on a piston rod and divides an interior of the damper tube into a first working chamber and a second working chamber;

c. a jounce cutoff (JCO) end-stop control valve disposed in the first working chamber, the JCO end-stop control valve comprising:

d. a JCO piston that is arranged on the piston rod and is configured to move longitudinally within the damper tube, the JCO piston having a valve seat, e. a JCO valve piston insert, wherein at one or more longitudinal locations along the piston rod within the damper tube a portion of the JCO valve piston insert is disposed radially within the JCO piston, wherein the JCO piston is longitudinally movable relative to the JCO valve piston insert in an assembled state of the vibration damper,

f. a JCO valve disc stack-up disposed on the piston rod, wherein a radially inner portion of the JCO valve disc stack-up is supported on a hub of the JCO valve piston insert and a radially outer portion of the JCO valve disc stack-up is supported on the valve seat of the JCO piston, and g. a JCO catch piston disposed within the damper tube, wherein the JCO piston is configured to engage the JCO catch piston and form a seal between the JCO piston and the JCO catch piston during an end-of-stroke JCO damping event, h. wherein the JCO piston and the JCO valve piston insert are configured such that a longitudinal distance between the valve seat and the valve hub increases during the end-of-stroke JCO damping event, wherein a damping force provided by the JCO end-stop control valve increases as the longitudinal distance between the valve seat and the valve hub increases during the end-of-stroke JCO damping event; and i. a rebound cutoff (RCO) end-stop control valve disposed in the second working chamber, the RCO end-stop control valve comprising:

j. an RCO piston that is arranged on the piston rod and is configured to move longitudinally within the damper tube, the RCO piston having a valve seat, k. an RCO valve piston insert, wherein at one or more longitudinal locations along the piston rod within the damper tube a portion of the RCO valve piston insert is disposed radially within the RCO piston, wherein the RCO piston is longitudinally movable relative to the RCO valve piston insert in an assembled state of the vibration damper, l. A RCO valve disc stack-up disposed on the piston rod, wherein a radially inner portion of the RCO valve disc stack-up is supported on a hub of the RCO valve piston insert and a radially outer portion of the RCO valve disc stack-up is supported on the valve seat of the RCO piston, and m. an RCO catch piston disposed within the damper tube, wherein the RCO piston is configured to engage the RCO catch piston and form a seal between the RCO piston and the RCO catch piston during an end-of-stroke RCO damping event, n. wherein the RCO piston and the RCO valve piston insert are configured such that a longitudinal distance between the valve seat and the valve hub increases during the end-of-stroke RCO damping event, wherein a damping force provided by the RCO end-stop control valve increases as the longitudinal distance between the valve seat and the valve hub increases during the end-of-stroke RCO damping event;

o. wherein the JCO end-stop control valve, the main piston, and the RCO end-stop control valve are disposed on the piston rod, clamped between a shoulder of the piston rod and a fastener disposed on a distal end of the piston rod.

15. The vibration damper of claim 14 wherein a clamping force exerted by the fastener helps generate positive initial preload in the JCO valve disc stack-up and in the RCO valve disc stack-up such that the JCO valve disc stack-up is elastically deformed and held against the valve seat of the JCO piston and such that the RCO valve disc stack-up is elastically deformed and held against the valve seat of the RCO piston prior to the end-of-stroke damping events.

16. The vibration damper of claim 14 wherein a damping force provided by the JCO end-stop control valve increases during the end-of-stroke JCO damping event as the JCO piston moves longitudinally closer to a longitudinal mid-point of the JCO valve piston insert.

17. The vibration damper of claim 14 configured such that during the end-of-stroke JCO damping event hydraulic fluid passes through both the JCO piston and the main piston but can pass freely between an exterior of the RCO piston and an inner wall of the damper tube, the vibration damper configured such that during the end-of-stroke RCO damping event hydraulic fluid passes through both the RCO piston and the main piston but can pass freely between an exterior of the JCO piston and the inner wall of the damper tube.

* * * * *